(12) United States Patent
Welch et al.

(10) Patent No.: US 11,816,056 B1
(45) Date of Patent: Nov. 14, 2023

(54) MAINTAINING SENSING STATE OF A SENSOR AND INTERFACING WITH DEVICE COMPONENTS

(71) Applicant: Amazon Technologies, Inc., Seattle, WA (US)

(72) Inventors: Gerald A Welch, San Jose, CA (US); Andrew Carl Brost, Cool, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/853,677

(22) Filed: Jun. 29, 2022

(51) Int. Cl.
G06F 13/40 (2006.01)
G06F 13/16 (2006.01)
G06F 13/24 (2006.01)

(52) U.S. Cl.
CPC .......... *G06F 13/4068* (2013.01); *G06F 13/16* (2013.01); *G06F 13/24* (2013.01); *G06F 2213/0016* (2013.01)

(58) Field of Classification Search
CPC ...... G06F 13/4068; G06F 13/16; G06F 13/24; G06F 2213/0016
See application file for complete search history.

(56) References Cited

U.S. PATENT DOCUMENTS

| | | | |
|---|---|---|---|
| 10,354,655 B1 | 7/2019 | White et al. | |
| 10,878,315 B1 | 12/2020 | Whatmough | |
| 11,272,141 B2 * | 3/2022 | Welch | G06F 3/165 |
| 11,343,274 B2 | 5/2022 | Jakubowski et al. | |
| 11,481,018 B2 | 10/2022 | Lin et al. | |
| 2013/0222609 A1 | 8/2013 | Soffer | |
| 2015/0097666 A1 | 4/2015 | Boyd et al. | |
| 2015/0159846 A1 | 6/2015 | Hollinger | |
| 2015/0248566 A1 | 9/2015 | Scott-Nash et al. | |
| 2016/0146903 A1 | 5/2016 | Yang et al. | |

(Continued)

FOREIGN PATENT DOCUMENTS

| | | |
|---|---|---|
| EP | 3410679 A1 | 12/2018 |
| WO | 2020159653 A1 | 8/2020 |

OTHER PUBLICATIONS

"Model-View-Controller", Wikipedia, Online Available at: <https://en.wikipedia.org/wiki/Model%E2%80%93view%E2%80%93controller>, 2012. 5 pages.

(Continued)

*Primary Examiner* — Henry Tsai
*Assistant Examiner* — Christopher A Daley
(74) *Attorney, Agent, or Firm* — Kilpatrick Townsend & Stockton LLP

(57) ABSTRACT

Techniques are described for controlling a sensing state of a device. In an example, a controller of the device receives, at a first time, first input data indicating a first request to disable a sensor of the device. The controller causes the sensor to be disabled and stores first data indicating that the sensor is disabled. The device can also include a processor. The controller sends, to the processor, first output data that causes the processor to read the first data from the controller. At a second time, the controller receives second input data indicating a second request for an operation of the device. The controller stores second data associated with the second request and sends, to the processor, second output data that causes the processor to read the second data from the controller.

20 Claims, 22 Drawing Sheets

(56) References Cited

U.S. PATENT DOCUMENTS

| | | | |
|---|---|---|---|
| 2016/0255204 A1* | 9/2016 | Vashisht | G06F 3/165 |
| | | | 370/260 |
| 2016/0345087 A1 | 11/2016 | Cox | |
| 2017/0245076 A1 | 8/2017 | Kusano et al. | |
| 2017/0263254 A1 | 9/2017 | Dewan et al. | |
| 2017/0273662 A1 | 9/2017 | Baym et al. | |
| 2017/0273663 A1 | 9/2017 | Baym et al. | |
| 2018/0048767 A1* | 2/2018 | Tinsman | H04M 3/42374 |
| 2018/0165472 A1 | 6/2018 | Adams et al. | |
| 2019/0159034 A1 | 5/2019 | Zeiler et al. | |
| 2019/0340906 A1 | 11/2019 | Williams | |
| 2020/0029143 A1 | 1/2020 | Cox | |
| 2020/0196141 A1 | 6/2020 | Baker et al. | |
| 2020/0260186 A1 | 8/2020 | Stachura | |
| 2020/0364991 A1 | 11/2020 | Scalisi | |
| 2021/0084406 A1 | 3/2021 | Fraize, Jr. et al. | |
| 2021/0325953 A1 | 10/2021 | Welch et al. | |
| 2021/0377587 A1 | 12/2021 | Ekanayake et al. | |
| 2022/0132636 A1 | 4/2022 | Welch et al. | |
| 2022/0159215 A1 | 5/2022 | Welch et al. | |

OTHER PUBLICATIONS

"What Does Controller Mean," Technopedia, Online Available at: <https://www.techopedia.com/definition/2359/controller-aspnet>, 2012. 1 page.

Wikipedia, "Amazon Echo," Available Online at: https://en.wikipedia.org/w/index.php?title=Amazon_Echo&oldid=884428761, Amazon Echo—Wikipedia, Accessed from Internet on Aug. 5, 2021, pp. 1-13.

"I2S Bus Specification", Philips Semiconductors, Available Online at: https://www.sparkfun.com/datasheets/BreakoutBoards/I2SBUS.pdf, Feb. 1986, 7 pages.

Williams, "How to Stop Alexa from Listening to You," TechRadar, Available Online at: https://www.techradar.com/in/how-to/how-to-stop-alexa-from-listening-to-you, Aug. 3, 2019, 9 pages.

\* cited by examiner

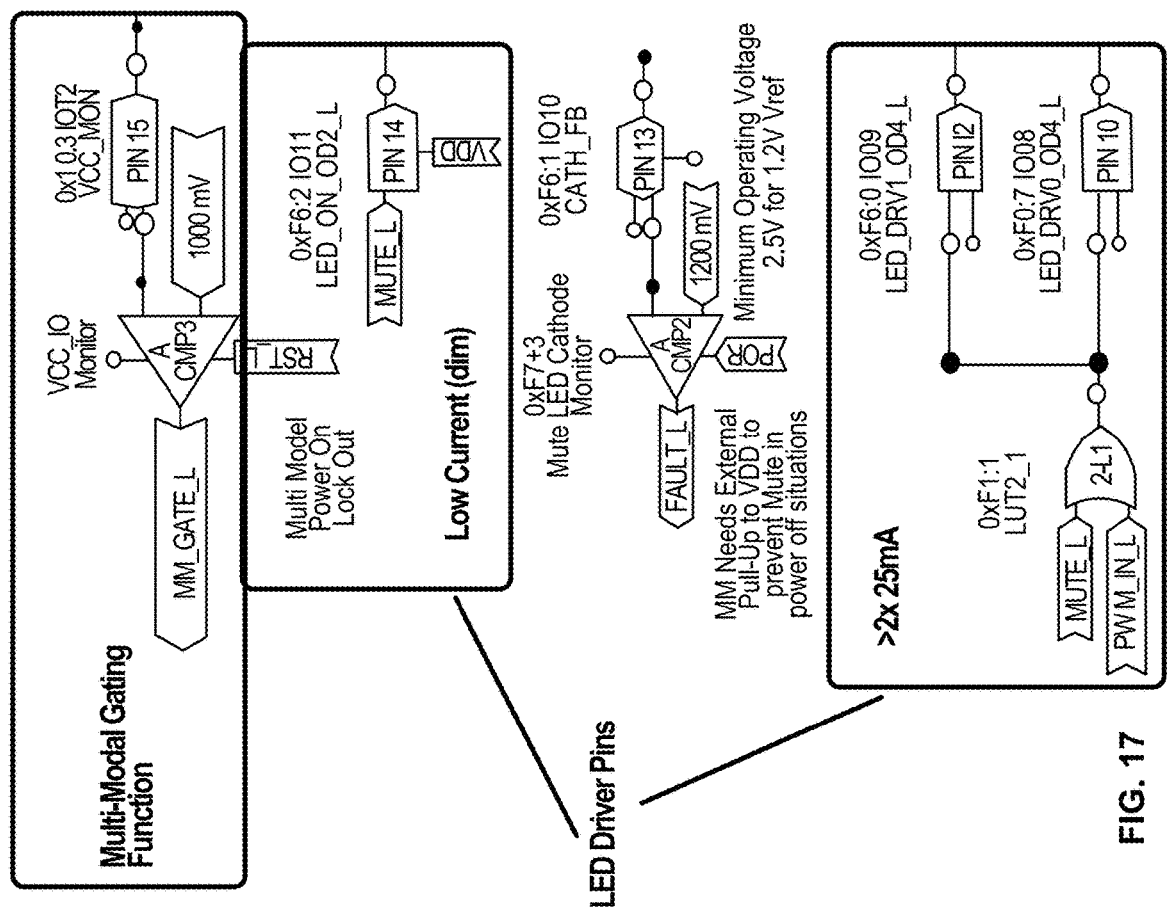
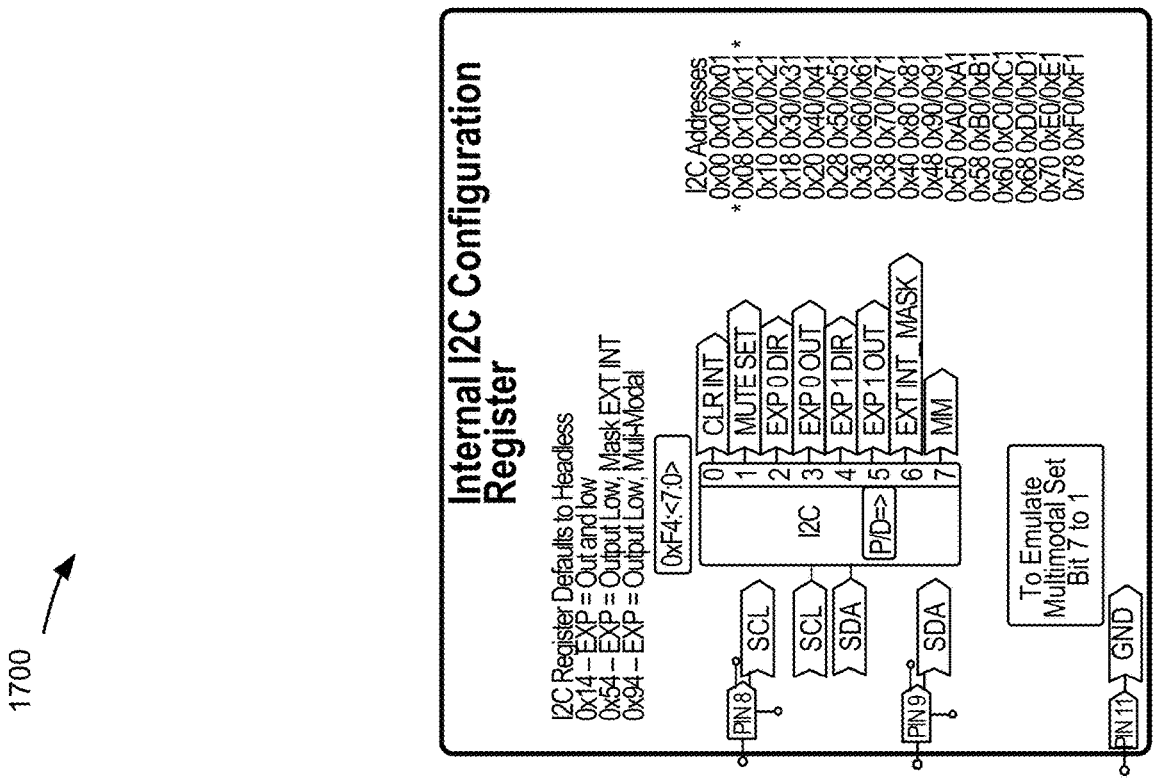
FIG. 17

MAINTAINING SENSING STATE OF A SENSOR AND INTERFACING WITH DEVICE COMPONENTS

BACKGROUND

A computing device can have various modalities for user interaction. Depending on the modalities, different types of user inputs can be received and processed to support different types of functionalities of the computing device. For example, a computing device can be a smart speaker that includes a microphone. The microphone can detect and send natural language utterances to an audio processor of the computing device for control of, for instance, a volume of the smart speaker or other functionalities thereof. In another example, the computing device includes the smart speaker, a camera, a display. In a two-way communication session, the camera can generate and send a video to another remote device. Further, the display can present video received from the remote device. Such computing devices and other computing device types can include buttons to enable and disable the different modalities.

BRIEF DESCRIPTION OF THE DRAWINGS

Various embodiments in accordance with the present disclosure will be described with reference to the drawings, in which:

FIG. 17 illustrates an example of a third portion of a circuit implementation of a controller, according to embodiments of the present disclosure;

DETAILED DESCRIPTION

Figure 1:
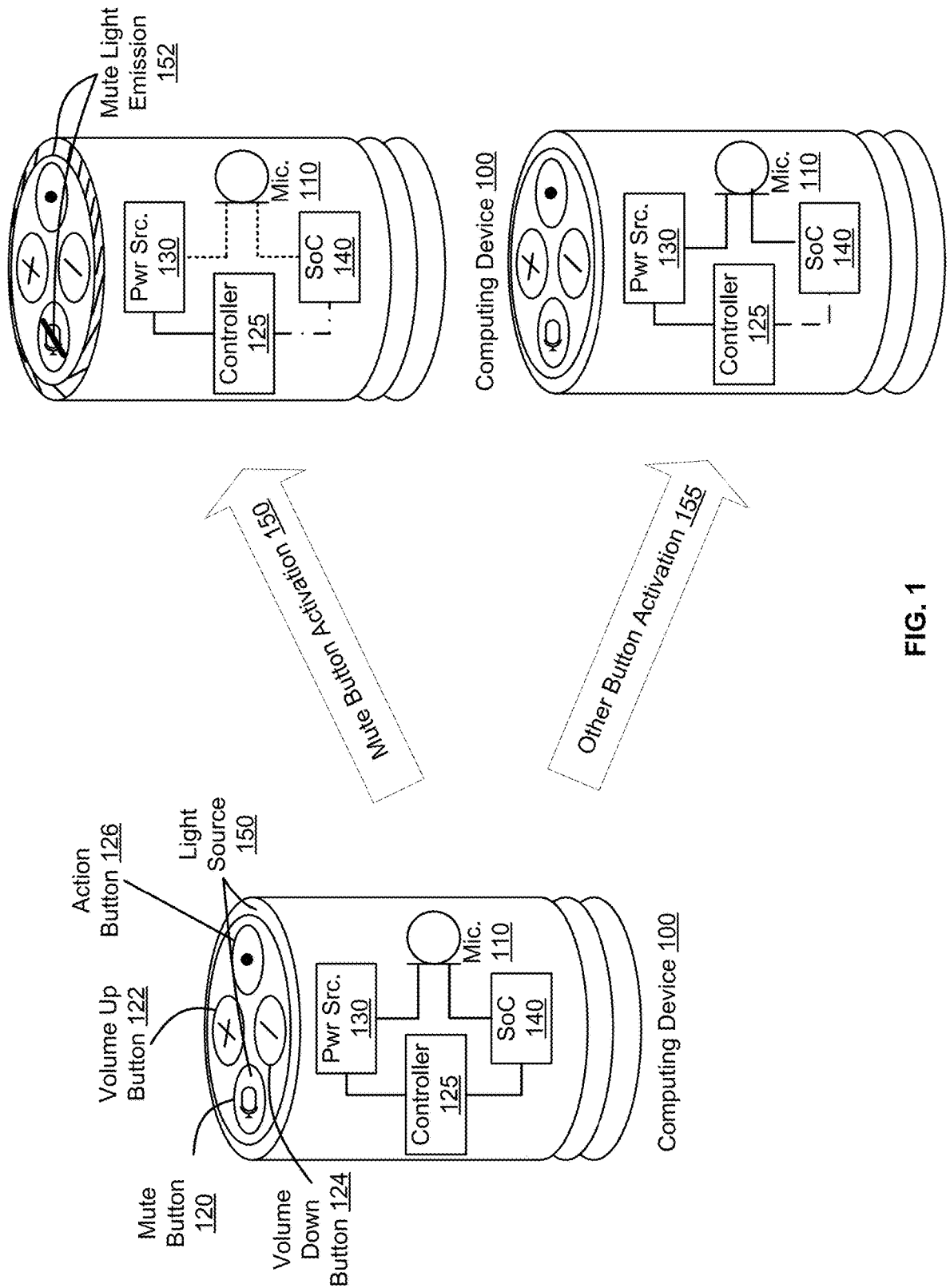
FIG. 1 illustrates an example of a computing device that includes a sensor and buttons for controlling a sensing state and operations of the computing device, according to embodiments of the present disclosure.

In the following description, various embodiments will be described. For purposes of explanation, specific configurations and details are set forth to provide a thorough understanding of the embodiments. However, it will also be apparent to one skilled in the art that the embodiments may be practiced without the specific details. Furthermore, well-known features may be omitted or simplified as not to obscure the embodiment being described.

Embodiments of the present disclosure are directed to, among other things, controlling a sensing state and operations of a computing device. In an example, the computing device includes a sensor, a first button that can enable or disable the sensor, a second button that can trigger an operation of the computing device (e.g., a volume up or down button that can be used to change an audio volume output of the computing device), a processor that can process data generated by the sensor, a light source that can emit light based on the sensing state. The computing device also includes a controller that is coupled with the buttons and the processor (e.g., via an inter-integrated circuit (I2C) interface). The controller can be implemented as hardware separate from the processor. Based on input data from the first button to change the sensing state (e.g., from enabled to disabled), the controller can cause the sensor to change the sensing state, store related data about the button activation, a state of the first button, and/or the sensing state, and can send interrupt data to the processor. Based on an activation of the second button to request the operation, the controller can also send interrupt data to the processor and store related data about the request. In both cases, upon receiving interrupt data, the processor can read, from the controller, some or all of the stored data for further processing. The controller can also interface (e.g., as an I2C expander) with other device components (e.g, light source drivers, microphone driver, etc.) that can read, from the controller, some or all of the stored data.

Further, the controller can also be configured to detect brownout of the device, such as an operating voltage drop below a threshold value, and a fault at the light source, such as the light source emitting light indicating that the sensor is disabled when the sensor is in fact enabled. Based on the brownout and/or the fault, the controller can lock the functionality of the first button. For instance, while the brownout is detected, the sensor is prevented from being disabled even if the first button is activated. In comparison, while the fault is detected, the sensor is disabled even if the first button is activated in an attempt to re-enable the sensor.

The controller can also be configured to determine configuration data of the computing device. The configuration data can indicate, among other things, the input/output modality of the computing device, such as whether the computing device is a headless device (e.g., a smart speaker) or a multi-modal device (e.g., one that supports a voice user interface and a graphical user interface). The controller can determine a power state of the device, such as a supply voltage. Based on the configuration data and/or the power state, functionalities of the first button can be enabled and/or disabled. In addition to mute and unmute functionalities, the first button can be enabled or disabled from being used as an action button (e.g., one that triggers an operation by the computing device, such as being powering ON or OFF the computing device). For instance, if the computing device is multi-modal, the power state indicates power ON, a long press of the first button (e.g., a button push exceeding a predefined time period) can be used to power OFF the computing device (or at least a component thereof, such as the processor). In comparison, if the computing device is headless, the long press can be used to mute the headless device.

Embodiments of the present disclosure provide technological advantages over existing systems to control a sensing state of a computing device. In particular, by using a controller that is separate from a processor, security of the computing device can be improved. In particular, the processor is prevented from having controls over the re-enabling a sensor of the computing device when the sensing state is disabled. Instead, the controls are provided by the controller that maintains the sensing state given. Hence, even when the processor is compromised (e.g., its software is hacked or includes a bug), the compromise does not affect how the sensing state can be controlled. Furthermore, by monitoring a voltage at the light source as one of the inputs, faults can be detected and mitigated. For instance, if the light source is emitting an indication that the sensor is disabled when in fact the sensor is enabled, the controller can force the sensor to be disabled. Similarly, by monitoring brownouts, falsely disabling the sensor can be prevented in situations where there are power glitches. By coupling multiple buttons to the controller, the design complexity of electrical conductors and flexes can be reduced. By also using configuration data, the same controller design can be used across different types of devices (e.g., headless and multi-modal devices). These and other technological improvements are further described in connection with the next figures.

In the interest of clarity of explanation, various embodiments of the present disclosure are described in connection with a computing device that includes a microphone and/or a camera. However, the embodiments are not limited as such and apply to controlling the sensing state (e.g., enabling the sensing or disabling the sensing by one or more sensors of the computing device) of any type of sensors including, for instance, motion sensors, temperature sensors, Lidar sensors, and the like. Various embodiments of the present disclosure are also described in connection with a system on a chip (SoC) and a microcontroller of the computing device. However, the embodiments are not limited as such and apply to any type of processors and controllers of the computing device.

FIG. 1 illustrates an example of a computing device 100 that includes a sensor and buttons for controlling a sensing state and operations of the computing device 100, according to embodiments of the present disclosure. In this illustrative example, the sensor is a microphone 110 (although other types of sensors are equivalently possible). The buttons include a mute button 120 to disable and enable the sensor (or, equivalently, mute and unmute the microphone 110), a volume up button 122 (e.g., to increase an audio volume output of the computing device 100), a volume down button 124 (e.g., to decrease an audio volume output of the computing device 100), and an action button 126 (e.g., to perform various actions, where each action can correspond to a set of operations executable by the computing device 100; the action button 126 can be used to enable an audio front end to generate audio data from utterance of a user, silence alarms, put the computing device 100 into setup mode, power ON or OFF the computing device 100, etc.).

The computing device 100 also includes a controller 125, a power source 130, an SoC 140, and a light source 150 among other components. As further illustrated in the next figures, the controller 125 can be coupled with the buttons 120-126, the microphone 110, the power source 130, the SoC 140, the light source 150, and/or other components of the computing device 100. The controller 125 provides various controlling functionalities related to enabling/disabling the microphone 110 and triggering one or more of the operations upon a button activation. For instance, the interface with the microphone 110 can be via a set of switches, whereas the interface with the power source 130 can be via a power switch to a voltage rail. The interface with the buttons 120-126 and the SoC 140 can include an I2C interface.

The power source 130 provides power to various components of the computing device 100. The power can be direct current (DC) power and the power source 130 and/or other components of the computing device 100 can include voltage converters, step-up transformers, step-down transformers, and the like to supply the proper power to the components of the computing device 100. The power can be supplied over different power lines, such as voltage rails, including a power line between the power source 130 and the microphone 110, a power line between the power source 130 and the SoC 140, and a power line between the power source 130 and the controller 125. For instance, the power line to the microphone 110 delivers 3.3 volts DC (VDC). A same or a different voltage can be delivered to the SoC 140 and/or the controller 125. The controller 125 can be in a power ON state, whereas the microphone 110 and the SoC 140 can be each in a power OFF state. For instance, the controller 125 can be powered ON when the power source 130 supplies electrical power to the computing device 100 (e.g., the computing device 100 being plugged into an external power outlet, or a charged battery pack may be installed in the computing device 100), whereas the microphone 110 and/or the SoC 140 can be controllably powered ON or OFF. The power source 130 can include rechargeable or disposable batteries and/or a receptacle to receive power from an external source, such as from a power outlet.

The SoC 140 can be an integrated circuit, such as a microchip, that integrates various computing components that provide some or all the functionalities of the computing device 110. These components can include a central processing unit (CPU), a memory and other data storages, analog to digital converters (ADCs), digital to analog converters (DACs,) network interface cards, and input/output ports. This and other potential hardware circuitry and/or software executed on such hardware circuitry provide the functionalities. For instance, the computing device 100 can be a smart speaker. In this case, the functionalities include wakeword detection, audio processing, communication with a backend server over a local area network, transmission and receipt of audio data, playing audio, and the like.

The SoC 140 and the microphone 110 can be coupled over a data line. The data line can carry audio data (digital or analog) from the microphone 110 to the SoC 140 for further processing, where the SoC 140 can execute an application that receives processed sensor data (e.g., a wakeword application to detect a wakeword, a communication application to transmit the audio data in a communication session with a remote computing device, and the like). For instance, the data line can be an inter-IC sound (I2S) bus carrying I2S serial data, where the specification of the I2S bus is defined in the "I2S bus specification," Philips Semiconductors, Jun. 5, 1996, the content of which is incorporated by reference herein in its entirety.

The light source 150 typically includes multiple light emitting elements, such as LEDs. A first et of LEDs is controlled by the controller 125 to indicate whether the microphone 110 is disabled or not (e.g., by emitting light having a particular light emission property to indicate the disabling and by not emitting the light otherwise). For example, this first set of LEDs can be installed under or in proximity to the mute button 120. The light source 150 can also include a second set of LEDs. This second set of LEDs can be controlled by the controller 125 and/or the SoC 140 (e.g., via program code executing on the SoC 140) to also indicate whether the microphone 110 is disabled or not and to indicate other device functionalities (e.g., to emit light having a different light emission property to indicate that the computing device 100 is detected audio). The second set of LEDs can be arranged in a ring, as shown in FIG. 1, of twenty-four red, blue, green (RGB) LEDs. An RGB LED can include a red LED, a green LED, and a blue LED. Other arrangements are also possible, such as a bar (e.g., a line that is vertical, horizontal, diagonal, etc.) of twelve RGB LEDs, or a dot (e.g., a circle) with six RGB LEDs. Of course, a different number of LEDs is possible. An LED driver can control the color and the intensity of light emitted by each RGB LED. Depending on the number of RGB LED, one or more LED drivers may be used.

In the illustration of FIG. 1, the computing device 100 has only one sensor: the microphone 110. In this case, the sensing state of the computing device 100 is the same as the sensing state of the microphone 110. In other words, if the sensor is enabled (the microphone 110 is unmuted), the sensing state of the computing device 100 is enabled (e.g., the computing device 100 is capable of receiving and processing audio sensed by the microphone 110). If the sensor is disabled (the microphone 110 is muted), the sensing state of the computing device 100 is disabled (e.g., the computing device 100 does not process audio of the microphone 110 because no audio is sensed by the microphone 110).

The mute button 120 can be a toggle switch. Upon a first activation, the sensing state can be changed from one state to another (e.g., from enabled to disabled). Upon a second activation, the sensing state can be changed back (e.g., from disabled to enabled). Other implementations of the mute button 120 are also possible including, for instance, a push button, a sliding button, and the like. In an example, the mute button 120 is implemented as a push and hold button. Upon a push and hold of the button for a time duration smaller than a predefined time length (e.g., three seconds or some other time value), the microphones 110 is disabled. Upon a push and hold of the button for a time duration longer than the predefined time length, the microphone 110 is not automatically muted. Instead, for instance, a user notification is presented (e.g., via a speaker or a GUI) to confirm that the disable sensing state should be entered or power off request is initiated. The mute button 120 can also be a software button displayed on a GUI based on an execution of a button application. In this case, the button application can be executed on the controller 125 such that the SoC 140 cannot at least control the sensing state of the microphone 110 from becoming enabled when it is disabled. The activation of the software button can be via a click, a touch, or a swipe on the GUI. The remaining buttons 122-126 can be similarly implemented (e.g., toggle switches, push and hold buttons, and/or soft buttons).

In the sensing state of enabled (referred to herein as enabled sensing state), the microphone 110 is enabled and detects audio, including natural language utterances, white noise, background noise such as music, and the like, generates audio data based on the detection, and sends the audio data to the SoC 140. In the sensing state of disabled (referred to herein as disabled sensing state), the microphone 110 is disabled and does not to detect any audio and no audio data is sent from the microphone 110 to the SoC 140. Preventing the audio detection and audio data transmission in the disabled state can be performed by powering off the microphone 110 and/or blanking the output of the microphone 110 to the SoC 140. Blanking includes zeroing the audio data (e.g., setting all data bits to have a zero value in case of digital audio data (e.g., all data bits become "0" bits), or setting the voltage level to zero volts of audio data in case of analog audio data).

As illustrated in FIG. 1, in the enabled sensing state, the microphone 110 is coupled with the power source 130 over the power line and, thus, is powered ON as illustrated with the solid line between the microphone 110 and the power source 130. Also in the enabled sensing state, the microphone 110 is coupled with the SoC 140 over the data line and, thus, outputs audio data to the SoC 140, as illustrated with the solid line between the microphone 110 and the SoC 140. The light source 150 does not emit light (e.g., red light) that indicates the disabled sensing state. The light emission indicating the disabling sensing state is referred to herein as mute light emission in the interest of clarity. Instead, the SoC 140 can control the light emission (e.g., by emitting a blue light to indicate that detection of a wakeword and the reception of speech input) by the second set of LEDs. Nonetheless, the SoC 140 may not cause a light emission by the second set of LEDs that resembles the mute light emission (e.g., a red light) that indicates the disabled sensing state (e.g., that the microphone 110 is muted).

Upon a mute button activation 150 (e.g., the mute button 120 being toggled, pressed and held, selected, as the case may be), the microphone 110 (or, equivalently, the computing device 100) is in the disabled sensing state. In the disabled sensing state, the microphone 110 is decoupled from the power source 130 as illustrated with the dotted line between the microphone 110 and the power source 130 (e.g., an open is created in the power line). Also, in the disabled sensing state, the output of the microphone 110 to the SoC 140 is blanked, as illustrated with the dotted line between the microphone 110 and the SoC 140. Here, the light source 150 emits light (e.g., red light) that indicates the disabled sensing state (shown as mute light emission 152 in FIG. 1). This light can be emitted by the first set of LEDs associated with the mute button 120 and by the second set of LEDs arranged as a ring (as shown in FIG. 1). The SoC 140 may not change the mute light emission and is prevented from unmuting the microphone 110. To unmute the microphone 110 (e.g., re-enter the enabled sensing state), the mute button 120 can be activated again.

Further, upon the mute button activation 150, the controller 125 can store data related to the mute button activation 150, a state of the mute button 120, and/or the sensing state and can send interrupt data to the SoC 140 (as indicated by the dashed line). The SoC 140 can read the stored data from the controller 125 and can determine that the mute button 120 has been activated, its state, and/or the sensing state.

Upon another button activation 155 (e.g., any of the volume up button 122, the volume down button 124, or the action button 126 being toggled, pressed and held, selected, as the case may be), the microphone 110 is not muted or unmuted. Instead, the relevant set of operations of the computing device 100 are triggered (e.g., to increase the audio volume, decrease the audio volume, or perform an action, as the case may be). Here, the controller 125 does not enable or disable the microphone 110 (as illustrated with the solid lines remaining solid between the microphone 110 and the power source 130 and between the microphone 110 and the SoC 140). Instead, the controller 125 can store data related to the other button activation 152 and/or a state of the activated button and can send interrupt data to the SoC 140 (as indicated by the dashed line). The SoC 140 can read the stored data from the controller 125 and can determine that the relevant button has been activated and/or the state of this button and can trigger the execution of the set of operation associated with the relevant button and/or its state.

The use of mute light emission is one example for indicating the sensing state (e.g., whether enabled or disabled). However, embodiments of the present disclosure are not limited as such. Other output modalities to indicate the sensing state are possible. The light source 150 is an example of a user interface that indicates the sensing state. Of course, other types of user interfaces are possible including, for instance, an audio interface (e.g., a speaker that plays a particular chime to indicate the sensing state) and/or a graphical user interface (GUI) that displays a notification to indicate the sensing state.

Figure 2:
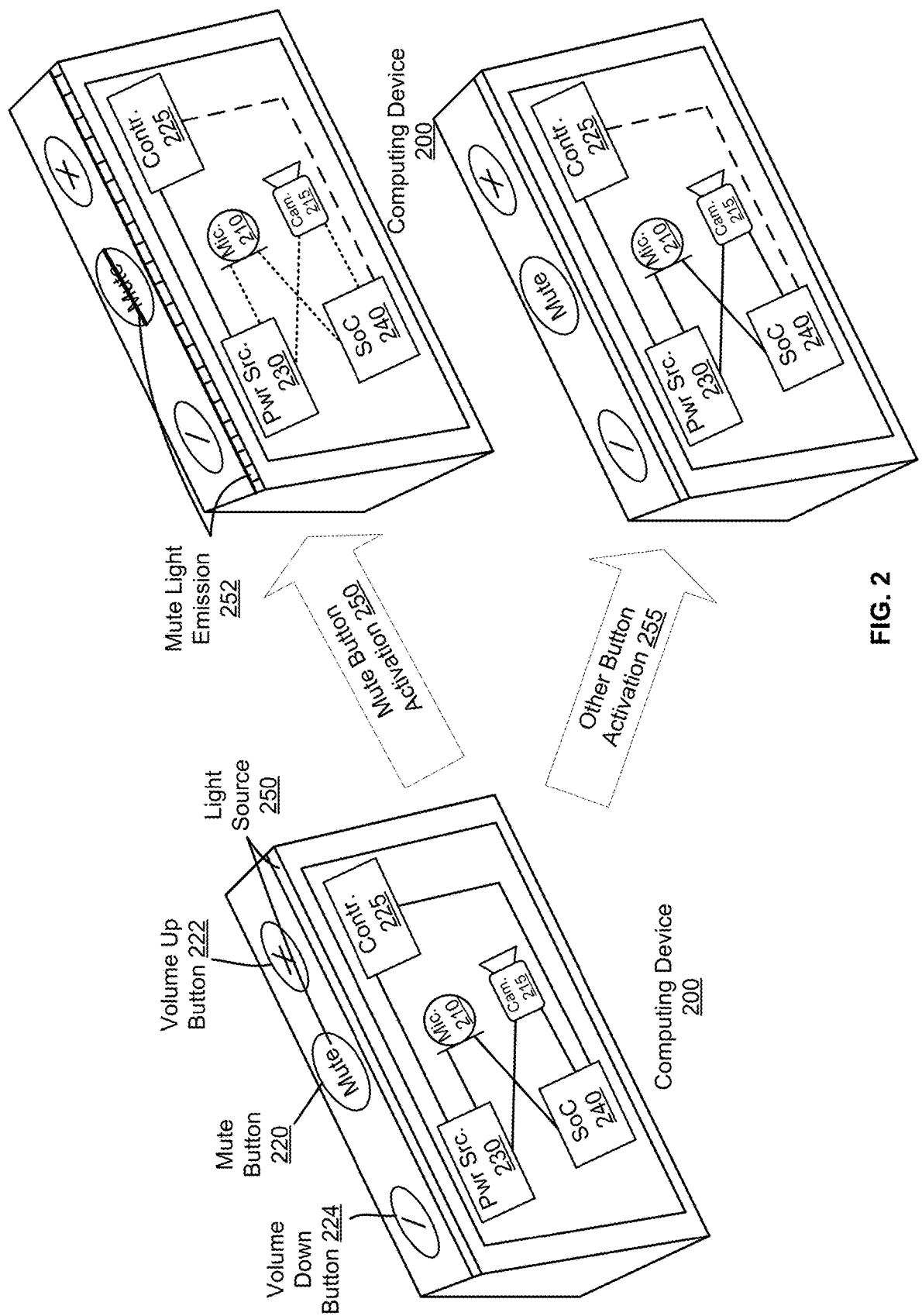
FIG. 2 illustrates an example of a computing device that includes multiple sensors and buttons for controlling a sensing state and operations of the computing device, according to embodiments of the present disclosure.

FIG. 2 illustrates an example of a computing device 200 that includes multiple sensors and buttons for controlling a sensing state and operations of the computing device 200, according to embodiments of the present disclosure. In this illustrative example, the computing device 200 includes two sensors: a microphone 210 and a camera 215 (e.g., a set of CMOS sensors and relevant circuitry), although a different number and other types of sensors are equivalently possible.

The microphone 210 and the camera 215 can support, for instance, an audio and video communication session with a remote device, where audio data and video data can be transmitted to the remote device and where audio data and video data can be received from the remote device and presented at the computing device 200 (e.g., via a speaker and a display of the computing device 200). The buttons include a mute button 220, a volume up button 222, and a volume down button 224 that are similar to the mute button 120, the volume up button 122, and the volume down button 124, respectively, of FIG. 1. An action button need not be included in the computing device 120.

The computing device 200 also includes a controller 225, a power source 230, an SoC 240, and a light source 250 among other components. As further illustrated in the next figures, the controller 225 can be coupled with the buttons 220-224, the microphone 210, the camera 215, the power source 230, the SoC 240, the light source 250, and/or other components of the computing device 200. The controller 225 provides various controlling functionalities related to enabling/disabling the microphone 210 and/or the camera 215 and triggering one or more of the operations upon a button activation. For instance, the interface with each of the microphone 210 and the camera 215 can be via a set of switches, whereas the interface with the power source 230 can be via a power switch to a voltage rail. The interface with the buttons 220-224 and the SoC 240 can include an I2C interface.

The power source 230 provides power to various components of the computing device 200. The power can be DC power and the power source 240 and/or other components of the computing device 200 can include voltage converters, step-up transformers, step-down transformers, and the like to supply the proper power to the components of the computing device 200. The power can be supplied over different power lines, such as voltage rails, including a first power line between the power source 230 and the microphone 210, a second power line between the power source 243 and the camera 215, a power line between the power source 230 and the SoC 240, and a power line between the power source 230 and the controller 225. For instance, the first power line to the microphone 210 delivers 3.3 VDC. The second power line to the camera 215 delivers 5 VDC. A same or a different voltage can be delivered to the SoC 240 and/or the controller 225. The controller 225 can be in a power ON state, whereas the microphone 210, the camera 215, and the SoC 240 can be each in a power OFF state. For instance, the controller 225 can be powered ON when the power source 230 supplies electrical power to the computing device 200 (e.g., the computing device 200 being plugged into an external power outlet, or a charged battery pack may be installed in the computing device 200), whereas the microphone 210, the camera 215, and/or the SoC 240 can be controllably powered ON or OFF. The power source 230 can include rechargeable or disposable batteries and/or a receptacle to receive power from an external source, such as from a power outlet.

The SoC 240 can be an integrated circuit, such as a microchip, that integrates various computing components that provide some or all the functionalities of the computing device 200, including the audio data and video data processing, transmission, reception, and presentation.

The SoC 240 and the microphone 210 can be coupled over a first data line. The first data line can carry audio data (digital or analog) from the microphone 210 to the SoC 240 for further processing where the SoC 240 can execute an application that receives processed sensor data (e.g., a wakeword application to detect a wakeword, a communication application to transmit audio/video data in a communication session with a remote computing device, an object recognition application to detect an object in video data, and the like). For instance, the first data line can be an I2S bus carrying I2S serial data. The SoC 240 and the camera 215 can also be coupled over a second data line. The second data line can carry video data (digital or analog) from the camera 215 to the SoC 240 for further processing (e.g., to detect that an object is present in the video data, to transmit the video data in a communication session with the remote computing device, and the like). For instance, the second data line can be a video interconnect bus that supports different compression formats including MPEG-4.

The light source 250 includes a set of light emitting elements, such as a set of LEDs. A first et of LEDs is controlled by the controller 225 to indicate a sensing state of the computing device 200 (e.g., by emitting light having a particular light emission property to indicate the disabling and by not emitting the light otherwise). For example, this first set of LEDs can be installed under or in proximity to the mute button 220. The light source 250 can also include a second set of LEDs. This second set of LEDs can be controlled by the controller 225 and/or the SoC 240 (e.g., via program code executing on the SoC 240) to also indicate whether the sensing state disabled or not and to indicate other device functionalities (e.g., to emit light having a different light emission property to indicate that the computing device 200 is detected audio). The second set of LEDs can be arranged in a bar, as show in FIG. 2, of twenty-four RGB LEDs. Other arrangements are also possible, such as a ring of twelve RGB LEDs, or a dot (e.g., a circle) with six RGB LEDs. Of course, a different number of LEDs is possible. An LED driver can control the color and the intensity of light emitted by each RGB LED. Depending on the number of RGB LED, one or more LED drivers may be used. When the computing device 200 includes a display, a virtual light bar can be presented on the display. The presentation of the virtual light bar can be controlled by the controller 225 and/or the SoC 240 to indicate the sensing state of the computing device 200 and can be controlled by the SoC 240 to indicate the other functionalities.

The microphone 210 can have an operational state that varies between an enabled sensing state and a disabled sensing state. In the enabled sensing state, the microphone 210 detects audio, including natural language utterances, white noise, background noise such as music, and the like, generates audio data based on the detection, and sends the audio data to the SoC 240. In the disabled sensing state, the microphone 210 does not detect any audio and no audio data is sent to the SoC 240. Similarly, the camera 215 can have an operational state that varies between an enabled sensing state and a disabled sensing state. In the enabled sensing state, the camera 215 detects video and sends the resulting video data to the SoC 240. In the disabled state, the camera 215 does not detect any video and no video data is sent to the SoC 240. The operational states of the microphone 210 and the camera 215 correspond to a privacy state of the computing device 200. Different privacy levels are possible based on a combination of the enabled/disabled sensing state of the microphone 210 and the enabled/disabled sensing state of the camera 215. For instance, one privacy level can be with the microphone 210 being operated in the enabled sensing state, while the camera 215 is operated in the disabled sensing state. Another privacy level can be with both the microphone 210 and the camera 215 being operated in disabled sensing states.

In an example, the operational states of the microphone 210 and the camera 215 can be synchronized. In other words, while the microphone 210 is in the enabled sensing state, the camera 215 is also in the enabled sensing state, and vice versa. While the microphone 210 is in the disabled sensing state, the camera 215 is also in the disabled sensing state, and vice versa. This synchronization can be implemented by using a single mute button to toggle between the states. In particular, upon an activation of the mute button (e.g., illustrated in FIG. 2 as a button activation 250), the microphone 210 and the camera 215 transition to the respective disabled sensing states. Upon deactivation of the mute button, the microphone 210 and the camera 215 transition to the respective enabled sensing states. The synchronization of the operational states of the microphone 210 and the camera 215 can be referred to herein to a single level of privacy state of the computing device 200.

In the illustration of FIG. 2, the computing device 200 has two sensors and is configured with the single level of privacy state. In this case, the sensing state of the computing device 200 is the same as the sensing state of the microphone 210 and the camera 215, where both sensors can be enabled at the same time or disabled at the same in response to an activation of the mute button 220. In other words, if the sensing state of the computing device 200 is enabled (referred to herein as enabled sensing state), each of the two sensors is also enabled (e.g., the microphone 210 and the camera 215 are each unmuted). Conversely, if the sensing state of the computing device 200 is disabled (referred to herein as disabled sensing state), each of the two sensors is also disabled (e.g., the microphone 210 and the camera 215 are each muted). Of course, other configurations are possible for a multi-level privacy state of the computing device 200, where multiple buttons can be used to individually enable and disable a sensor or a single button can be used and have different states, where each of the button states can disable or enable one or more of the sensors. In such a case, a sensing state of a computing device corresponds to a sensing state of a sensor(s) rather than all of its sensors depending on how the button configuration is implemented.

The mute button 220 can be implemented similarly to the mute button 120 described in connection with FIG. 1, where the mute button 220 can be a physical button (e.g., a toggle button, a push button, or a sliding button), or a software button (e.g., a non-reprogrammable application that presents a toggle button, a push button, or a sliding button on a GUI). Likewise, the volume up button 222 and the volume down button 224 can be implemented similarly to the volume up button 122 and the volume down button 124, respectively, of FIG. 1.

While the computing device 200 is in the disabled sensing state, embodiments of the present disclosure prevent the audio detection and audio data transmission by powering off the microphone 210 and blanking the output of the microphone 210 to the SoC 240. Blanking includes zeroing the audio data (e.g., setting all data bits to have a zero value in case of digital audio data, setting the voltage level to zero volts of audio data in case of analog audio data). Similarly, while the computing device 200 is in the disabled sensing state, the embodiments of the present disclosure prevent the video detection and video data transmission by powering off the camera 215 and blanking the output of the camera 215 to the SoC 240. This blanking includes, for instance, sending a camera disable signal (e.g., a camera disabled status) to the SoC 240 to disable the video processing at the SoC 240. Alternatively or additionally, blanking the output of the camera 215 includes zeroing the video data on each data line between the camera 215 and the SoC 240.

As illustrated in FIG. 2, prior to a button activation 250, the computing device 200 is in the enabled sensing state, whereby the microphone 210 and the camera 215 are enabled. In the enabled sensing state, the microphone 210 is coupled with the power source 240 over the first power line and, thus, is powered on as illustrated with the solid line between the microphone 210 and the power source 240. Also in the enabled sensing state, the microphone 210 is coupled with the SoC 240 over the first data line and, thus, outputs audio data to the SoC 240, as illustrated with the solid line between the microphone 210 and the SoC 240. Similarly, in the enabled sensing state, the camera 215 is coupled with the power source 240 over the second power line and, thus, is powered on as illustrated with the solid line between the camera 215 and the power source 240. Also in the enabled sensing state, the camera 215 is coupled with the SoC 240 over the second data line and, thus, outputs video data to the SoC 240, as illustrated with the solid line between the camera 215 the SoC 240. The light source 250 does not emit light (e.g., red light) that indicates the disabled sensing state. Instead, the SoC 240 can control the light emission (e.g., by emitting a blue light to indicate that detection of a wakeword and the reception of speech input). Nonetheless, the SoC 240 may not cause a light emission that resembles the mute light emission (e.g., a red light) that indicates the disabled sensing state.

Upon the mute button activation 250 (e.g., an activation of the mute button 220), the computing device 200 is in the disabled sensing state, whereby the microphone 210 and the camera 215 are disabled. In the disabled sensing state, the microphone 210 is decoupled from the power source 240 as illustrated with the dotted line between the microphone 210 and the power source 240 (e.g., an open is created in the first power line). Also in the disabled sensing state, the output of the microphone 210 to the SoC 240 is blanked, as illustrated with the dotted line between the microphone 210 and the SoC 240. Similarly, in the disabled sensing state, the camera 215 is decoupled from the power source 240 as illustrated with the dotted line between the camera 215 and the power source 240 (e.g., an open is created in the second power line). Also in the disabled sensing state, the output of the camera 215 to the SoC 240 is blanked, as illustrated with the dotted line between the camera 215 and the SoC 240. Here, the light source 250 emits light (e.g., red light) that indicates the disabled sensing state (shown as mute light emission 252 in FIG. 1). The SoC 240 may not change the mute light emission and may be prevented from changing the disabled sensing state. To enable the microphone 210 and unblank the camera 215 (e.g., re-enter the enabled sensing state), the mute button 220 can be activated again.

Further, upon the mute button activation 250, the controller 225 can store data related to the mute button activation 250, a state of the mute button 220, and/or the sensing state and can send interrupt data to the SoC 240 (as indicated by the dashed line). The SoC 240 can read the stored data from the controller 225 and can determine that the mute button 220 has been activated, its state, and/or the sensing state.

Upon another button activation 255 (e.g., any of the volume up button 222 or the volume down button 222 being toggled, pressed and held, selected, as the case may be), each of the microphone 210 and the camera 215 is not enabled or disabled. Instead, the relevant set of operations of the computing device 200 are triggered (e.g., to increase the audio volume or decrease the audio volume). Here, the controller 225 does not enable or disable the microphone 210 or the camera 215 (as illustrated with the solid lines remaining solid between each of the microphone 210 and camera 215 and the power source 230 and between each of the microphone 210 and camera 215 and the SoC 240). Instead, the controller 225 can store data related to the other button activation 252 and/or a state of the activated button and can send interrupt data to the SoC 240 (as indicated by the dashed line). The SoC 240 can read the stored data from the controller 225 and can determine that the relevant button has been activated and/or the state of this button and can trigger the execution of the set of operation associated with the relevant button and/or its state.

In certain examples, configuration data can be stored by the controller 225 and indicate that the computing device 220 is multi-modal. In this case, the mute activation button 250 can result in performing a set of operations other than the disabling of the microphone 210 and the camera 215. As further described in connection with the next figures, based on the configuration data and a power state associated with the computing device 250 (e.g., a power state of any or a combination of device components including, for instance, the microphone 210, the camera 215, the controller 225, the power source 230, and/or the SoC 240, where the power state is ON or OFF), the controller 225 can enable and/or disable various functionalities of the mute button 220. For example, the mute button 220 can be used as an action button rather than or in addition to its functionality to disable/enable the microphone 210 and the camera 215. When used as an action button, the controller 225 can trigger the SoC 240 (by storing the relevant data, sending an interrupt to the SoC 240, and providing the relevant data to the SoC 240 upon a read request) to execute a set of operations. The execution can result, at least in part on, the SoC 240 presenting multiple selectable actions (e.g., in a menu presented in a graphical user interface on the display and/or in a voice user interface on a speaker). User input can be received indicating a selection of an action, whereby the SoC 240 can trigger the action. The selectable actions include, by way of example, the powering OFF of the computing device, the disabling of the microphone 210 or the camera 215, or other device functionalities. Such use of configuration data and power state so that a mute button can be an action button can also be implemented by the controller 125 of FIG. 1.

Although FIG. 2 illustrates the computing device 200 as including a single SoC 240 and a single power source 240, other configurations of the computing device 200 are possible. For instance, the computing device 200 can include more than one SoC, each coupled to one of the microphone 210 or the camera 215, and/or more than one power source, each coupled to one of the microphone 210 or the camera 215.

Furthermore, although FIG. 1 illustrates a computing device that includes a single sensor, and although FIG. 2 illustrates a computing device that includes two sensors, it is possible to include a larger number of sensors (e.g., more than two) in a computing device. Nonetheless, and as further illustrated in the next figures, a single controller may suffice to support any number of sensors. This controller can be thought of as a universal controller capable of supporting one or more sensors and one or more different types of sensors. To account for the variability in the number and/or type of sensors, one or more, as applicable, gating peripherals can be included in the computing device, where the gating peripheral(s) is (are) coupled with the controller, the sensor(s), and the SoC(s).

Additionally, the sensing state of a computing device can be referred as a privacy state. The privacy state can include a number of privacy levels depending on the number of sensors. When a computing device includes a single sensor, the privacy state is a single level (e.g., enabled or disabled) and corresponds to the sensing state of the single sensor. In particular, when the sensor is disabled, the computing device's privacy state is enabled. When the sensor is enabled, the computing device's privacy state is disabled. In comparison, when the computing device includes multiple sensors, the privacy level can be multi-levels and each level depends on the sensing states of the sensors. For instance, when a first sensor is enabled and a second sensor is disabled, the privacy state is at a first privacy level. When the first sensor and the second sensor are disabled, a second privacy level is achieved and is relatively higher than the first privacy level. The computing device can include a controller, such as the controller 125 or 225 described herein above, to control the sensing state of each sensor and the overall privacy state of the device. Such a controller can be referred to as a privacy controller and can be implemented as a privacy integrated circuit (IC). The privacy controller can be coupled with multiple buttons, where one or more of these buttons can be used to request a sensing state change. The privacy controller can cause sensing state(s) of the relevant sensor(s) to change and can indicate to one or more processors configured to process sensor data the change and/or the button activation(s).

Figure 3:
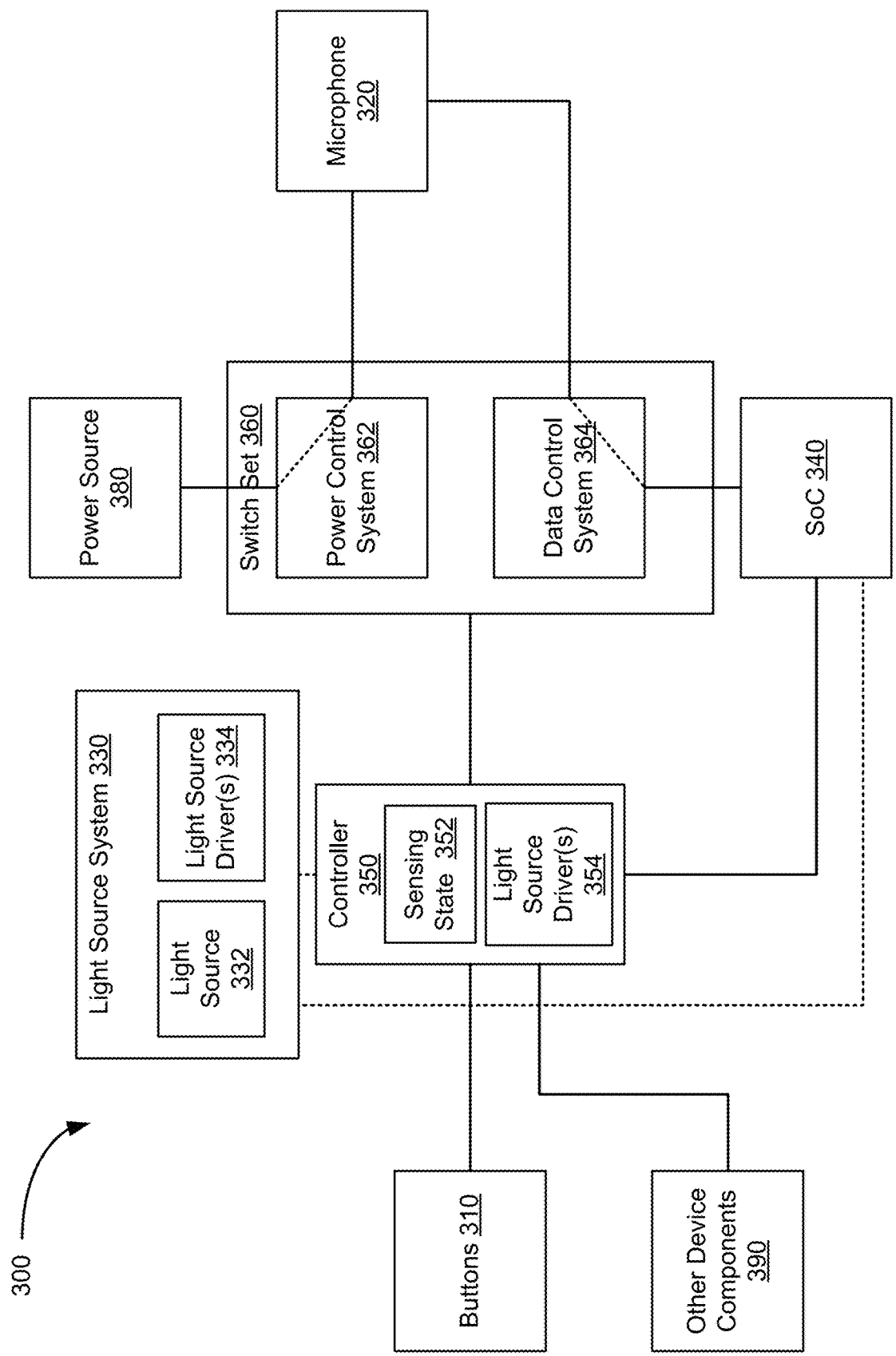
FIG. 3 illustrates an example of a diagram of a computing device that includes a sensor and that controls a sensing state and operations, according to embodiments of the present disclosure.

FIG. 3 illustrates an example of a diagram of a computing device 300 that includes a sensor and that controls a sensing state and operations, according to embodiments of the present disclosure. In this illustrative example, the sensor is a microphone 320 (although other types of the sensor are equivalently possible) and the computing device 300 is an example of the computing device 100 of FIG. 1.

As illustrated, the computing device 300 includes buttons 310, the microphone 320, a light source system 330, an SoC 340, a controller 350, a switch set 360, a power source 380, and other device components 390 (e.g., microphone drivers, etc.). The buttons 310 can include a mute button, similar to the mute button 120 of FIG. 1, in addition to other types of buttons. The light source system 330 can include a light source 332 and, depending on the implementation of the light source 332, one or more light source drivers 334. As explained herein above, the light source 332 can include multiple light emitting elements. A set of such elements can be associated with a mute button (e.g., by being installed under or in proximity to the mute button) and controlled by the controller 350. The controls can be effectuated by light source driver(s) 354 included in the controller 350. The controller 350 maintains, among other things, a sensing state 352 that indicates whether the microphone 310 is enabled (e.g., enabled sensing state) or disabled (e.g., disabled sensing state). The sensing state 352 can be stored as sensing state data in a memory of the controller 350. The sensing state data is used for controlling the sensing state of the microphone 320 and light emission by the light source 332 depending on input data from the mute button, the SoC 340, and the light source 332.

In an example, the controller 350 interfaces with some or all of the buttons 310, the Soc 340, the light source system 330, and/or the other device components 390. The same type of interface can be used for these different components. Alternatively, different types of interfaces can be implemented. For instance, the controller 350 includes pins electrically coupled with the pins of these components in support of one or more interfaces.

For instance, the controller 350 is coupled, via the I2C interface, with both the SoC 340 and elements of the light source system 330. The controller 350 can arbitrate and control light emissions by the light source 332. In particular, light emission requests (e.g., to emit a particular light) of the SoC 340 are received by the controller 350, processed based on the sensing state 352 and other light-related data, and sent from the controller 350 to the light source system 330. Similarly, upon a determination of the disabled sensing state, the controller 350 can instruct the light source system 330 to emit a particular light to indicate the disabled sensing state. And upon feedback from the light source system 330 of a light emission fault (e.g., mute light emission that indicates the disabled sensing state is occurring while the sensing state 352 indicates the enabled sensing state), the controller 350 can instruct the light source system 330 to emit the light that indicates the disabled sensing state.

In another illustration, the controller 350 is coupled bi-directionally with the SoC 340 via the via the I2C interface and unidirectionally with the light source system 330. The controller can maintain the sensing state 352, indicates it to the SoC 340, and the SoC 340 (also coupled with the light source system 330) instructs the light source system 330 to emit the particular light that indicates the disabled sensing state. Light emission requests of the SoC 340 are sent directly from the SoC 340 to the light source system 330 (e.g., to emit a particular light), are received by the controller 350, processed based on the sensing state and other light-related data, and sent from the controller 350 to the light source system 330. Upon feedback from the light source system 330 of a light emission fault (e.g., mute light emission that indicates the disabled sensing state is occurring while the sensing state 352 indicates the enabled sensing state), the controller 350 can request the SoC 340 to instruct the light source system 330 to emit the light that indicates the disabled sensing state. Differences between the interposer and passive sniffer configurations in terms of couplings of the controller 350 with the SOC 340 and the light source system 330 are illustrated in FIG. 3 with dotted lines.

In both illustrations above, some of the pins of the controller 350 can be electrically coupled to the buttons 310. The controller 350 can store, at different memory locations of the controller 350 (e.g., in registers) whether a button is activated and/or a state of the button. The memory locations can be associated with corresponding I2C addresses. Further, some of the pins of the controller 350 can be configured as general purpose input/output (GPIO) or general purpose output (GPO) pins in support of I2C expanders. One or more other device components 390 can be electrically coupled to the controller 350 via such pins and can at least read some of the stored data using I2C addresses. Additionally, because the other device components 390 are coupled with the controller 350, the controller 350 can receive, for instance, an external interrupt from any of these components 390, store data related to the interrupt and/or the relevant component, and send, in turn, an interrupt to the SoC 340.

As described herein above, the buttons 310 can include a mute button operable to mute (e.g., disable) and unmute (e.g., enable) the microphone 320. The mute button is coupled with the controller 350 over a data line that carries a mute button signal from the button 310 to the controller 350. Other components can be coupled on this data line including, for instance, a resistor and capacitor (R/C) circuit connected in between the button 310 and the controller 350, where this R/C circuit filters out edges of the mute button signal. The mute button can be implemented as a switch.

When the switch is open, the mute button signal is set to inactive to indicate that the computing device 300 (or, equivalently, the microphone 320) should be in the enabled sensing state. When the switch is closed, the mute button signal is set to active to indicate that the computing device 300 (or, equivalently, the microphone 320) should be in the disabled sensing state instead. Inactive and active can be set by using a low voltage for inactive and a high voltage for active, or vice versa depending on the implementation.

In addition to receiving the mute button activation as a first input signal, the controller 350 can receive additional input signals from the other coupled buttons or any one of the other coupled components. For instance, the controller 350 can receive a button signal from any of these buttons upon its activation and can store data related to the activation and/or the state of the button. The controller 350 can send an interrupt (e.g., as interrupt data carried by an interrupt signal) to the SoC 340. Further, from the SoC 340, the controller 350 can receive an SoC status signal and, possibly, an SoC light emission request signal and a light source intensity signal. The SoC status signal indicates a status of the SoC 340 including, for instance, where the SoC 340 is booting, the booting is complete, and the like. The SoC light emission request signal can indicate a request for a light emission by the light source 332. The light source intensity signal indicates a setting according to which the light source 332 should emit the light. In addition, the controller 350 can receive a read request from the SoC 340 requesting any of the data stored by the controller 350. A read request can identify an I2C address from which data is to be read.

From the light source 332, the controller 350 receives a light source voltage feedback signal indicating a voltage level at the light source 332 (e.g., at a cathode of an LED or a common cathode of an RGB LED of the light source 332). As further described in the next figures, the controller 350 can determine a failure in the light source 332 based on the voltage level (e.g., a hardware failure causing the light source 332 to emit visible light when no such light emission should be occurring) and can force, as applicable, the transition from the enabled sensing state to the disabled sensing state. In addition, the controller 350 can send mute data to the light source driver(s) 334 to control the light emission by the light source 332.

Based on the received input signals, the controller 350 can maintain the sensing state 352, and generate and output multiple output signals. For redundancy and higher fidelity, some of the output signals can be redundant. In addition, for a graceful termination of relevant software execution on the SoC 340, some of the output signals can be delayed relative to other output signals. In an example, the controller 350 is a dedicated microcontroller that implements logic to generate the output signals based on the input signals, where this dedicated hardware can include a microcontroller, a field-programmable gate array (FPGA), a programmable logic device (PLD), a complex PLD (CPLD), a central processing unit (CPU), an SoC, and/or other circuitry that may execute firmware and/or software, where such circuitry is non-programmable, to prevent any compromise in the SoC 340 from impacting the controls of the controller 350.

As described herein above, the controller 350 is coupled with the light source system 330, the SoC 340, and the switch set 360. To the light source 332 or a light source driver(s) 334 as applicable, the controller 350 can send a light emission signal and a light source intensity signal in the interposer configuration. In the disabled sensing state, the light emission signal indicates that the light source 332 should emit a particular visible light (e.g., red). In the enabled sensing state, the light emission signal indicates that the light source 332 should stop emitting the particular visible light. When visible light should be emitted, the light source intensity signal indicates a setting for the light emission (e.g., the power level of the light emission), where this setting can correspond to the indication from the SoC and/or can be based on an input signal from an ambient light sensor (ALS) that can be coupled with the controller 350 (e.g., as one of the other device components 390).

To the SoC 340, the controller 350 can output an interrupt signal. For instance, this interrupt signal can correspond to a change in the sensing state 352. In response, the SoC 340 can read data stored by the controller 350. This data can indicate any or a combination of a mute button activation, a state of the mute button, or the sensing state. One value of the button activation signal indicates that the mute button activated to request the disabled sensing state. Another value of the button activation signal indicates that the mute button 310 was activated to request the enabled sensing state. Similarly, the button state can have a value indicating that the button is activated and another value indicating that the mute button is deactivated. The sensing state can indicate whether the sensing state 352 is enabled or disabled or can indicate the change to the sensing state 352. Similar interrupt signals can be generated and sent to the SoC 340 upon another button activation and/or an external interrupt and can be followed by the SoC 340 reading the relevant data from the controller 350.

To the switch set 360, the controller 350 outputs a first mute state signal (a mute state signal can also be referred to, more generically, as a sensing state signal) and, optionally, a second mute state signal. The second mute state signal can be redundant to the first mute state signal. For instance, the second mute state signal is the complement of the first mute state signal. By using the complement, logic (e.g., implemented as logic gates) can be included in the switch set 360 to help against improper control of the SoC 340 over the operations of the controller 350 and/or operations of the switch set 360. In addition, the first mute state signal (and, similarly, the second mute state signal) can be delayed by the delay time interval relative to the interrupt signal transmitted to the SoC 340. One value of the first mute state signal indicates the enabled sensing state. Another value of the first mute state signal indicates the disabled sensing state.

Upon receiving the indication from the controller 350 that the microphone 320 should be disabled (e.g., by receiving the first mute state signal and, optionally, the second mute state signal with the relevant values), the switch set 360 decouples the microphone 320 from the power source 380 and blanks the data line that couples the microphone 320 to the SoC 340. Conversely, upon receiving the indication from the controller 350 that the microphone 320 should be enabled (e.g., by receiving the first mute state signal and, optionally, the second mute state signal with the relevant values), the switch set 360 couples the microphone 320 to the power source 380 and no longer blanks the data line that couples the microphone 320 to the SoC 340.

In an example, the switch set 360 includes a power control system 362 and a data control system 364. The power control system 362 receives the first mute state signal. When the first mute state signal indicates that the microphone 320 should be disabled, the power control system 362 severs a connection between the power source 380 and the microphone 320, such as by creating an open circuit (e.g., opens a switch) on the power line that couples the power source 380 and the microphone 320, thereby powering off the microphone 320. Conversely, when the first mute state signal indicates that the microphone 320 should be enabled, the power control system 362 closes the circuit (e.g., closes the switch) on the power line that couples the power source 380 and the microphone 320, thereby powering on the microphone 320. The power control system 362 can include any of a power switch or a power regulator.

When only the first mute state signal is transmitted by the controller 350, the data control system 364 receives the first mute state signal. When redundancy is used, where the second mute state signal is also transmitted by the controller 350, the data control system 364 receives the second mute state signal instead. In both cases, when the disabled sensing state is indicated, the data control system 364 zeros the voltage level on the data line. When the enabled sensing state is indicated, no zeroing is performed, thereby the actual audio data sent by the microphone 320 is carried over the data line to the SoC 340. The data control system 364 can include any of a data switch or a set of logic gates.

As illustrated in FIG. 3, the controller 350 is implemented and operated separately from the SoC 340 to increase the security of the muting of the microphone 320. Such an implementation can also involve implementing the switch set 360 separately from the SoC 340. The switch set 360 can be implemented in the controller 350. However, the switch set 360 can be implemented separately from the controller 350, so that the controller 350 can be designed as a universal controller that can be coupled with multiple switch sets, each corresponding to one or more sensors, as further described in FIG. 4.

Figure 4:
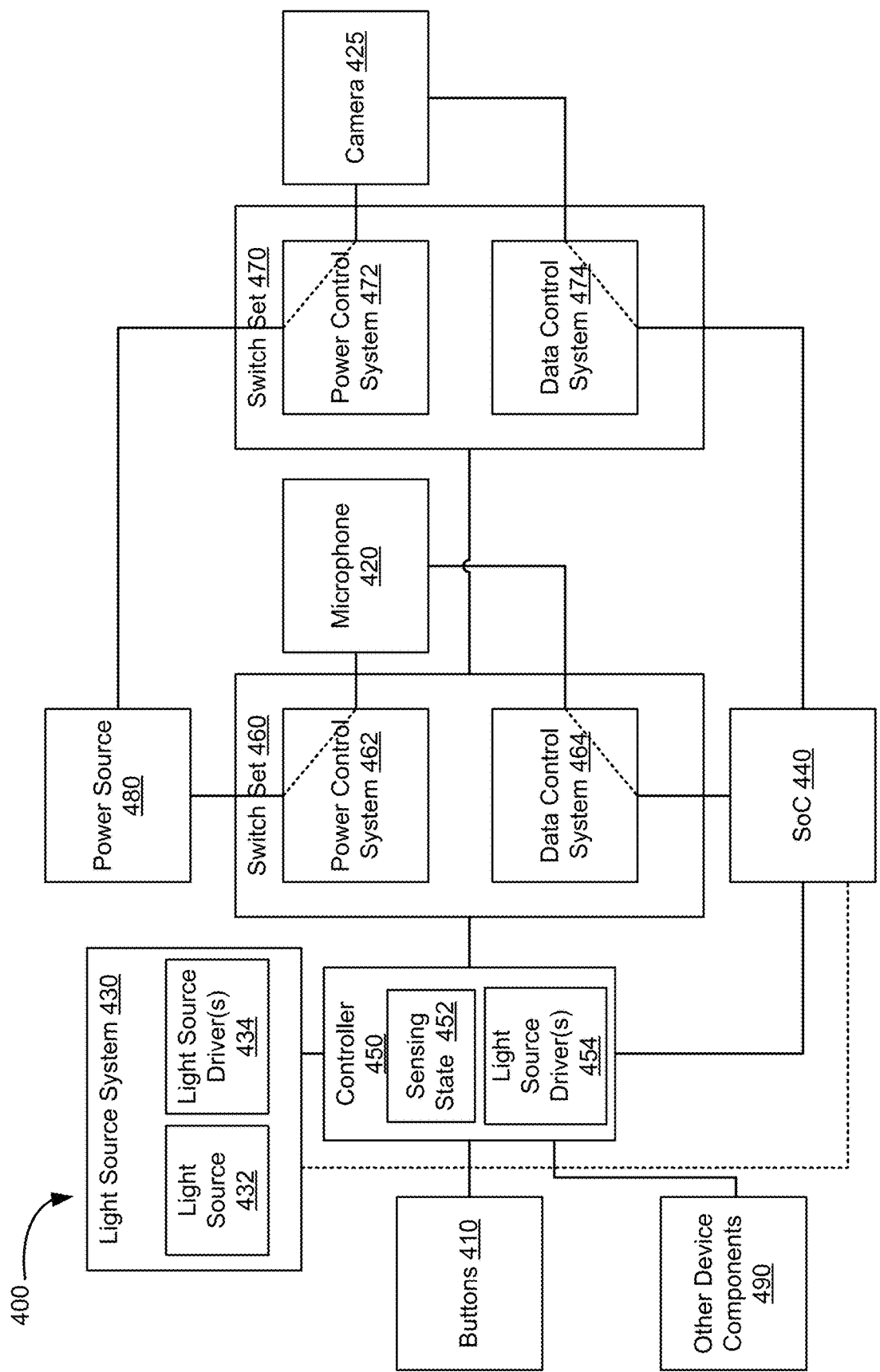
FIG. 4 illustrates an example of a diagram of a computing device that includes multiple sensors and that controls a sensing state and operations, according to embodiments of the present disclosure.

FIG. 4 illustrates an example of a diagram of a computing device 400 that includes multiple sensors and that controls a sensing state and operations, according to embodiments of the present disclosure. In this illustrative example, the computing device 400 include two sensors: a microphone 420 and a camera 425, although other types and/or a larger number of sensors are equivalently possible. The computing device 400 is an example of the computing device 200 of FIG. 2. A sensing state of the computing device 400 corresponds to both the microphone 420 and the camera 425 being in the same sensing state. A disabled sensing state of the computing device 400 corresponds to both the microphone 420 and the camera 425 being disabled. An enabled sensing state of the computing device 400 corresponds to both the microphone 420 and the camera 425 being enabled.

As illustrated, the computing device 400 includes buttons 410, the microphone 420, the camera 425, a light source system 430, a SoC 440, a controller 450, a switch set 460, a switch set 470, a power source 480, and other device components 490 (e.g., microphone drivers, etc.). Each of the buttons 410, the microphone 420, the light source 432, the SoC 440, the controller 450, the switch set 460, and the other device components 40 can be the same as the buttons 310, the microphone 320, the light source system 330, the SoC 340, the controller 350, the switch set 360, and the device components 390, respectively, of FIG. 3. The switch set 470 is implemented to couple the controller 450 to the camera 425, thereby extending the controls of the controller 450 to not only cover the microphone 420, but to also cover the camera 425.

The light source system 430 includes a light source 432 and, depending on the implementation of the light source 432, one or more light source drivers 434. As explained herein above, the light source 432 can include multiple light emitting elements. A set of such elements can be associated with a mute button (e.g., by being installed under or in proximity to the mute button) and controlled by the controller 450. The controls can be effectuated by light source driver(s) 454 included in the controller 450. The controller 450 maintains, among other things, a sensing state 452 that indicates whether the microphone 420 and/or the camera 425 are enabled (e.g., enabled sensing state) or disabled (e.g., disabled sensing state). The sensing state 452 can be stored as sensing state data in a memory of the controller 450. The sensing state data is used for controlling the sensing state of the microphone 420 and/or camera 425 and light emission by the light source 432 depending on input data from the button 410, the SoC 440, and the light source 432.

In an example, the controller 450 interfaces with some or all of the buttons 410, the Soc 440, the light source system 430, and/or the other device components 490. The same type of interface can be used for these different components. Alternatively, different types of interfaces can be implemented. For instance, the controller 450 includes pins electrically coupled with the pins of these components in support of one or more interfaces.

For instance, the controller 450 is coupled, via the I2C interface, with both the SoC 440 and the light source system 430. The controller 450 can arbitrate and control light emissions by the light source 432. Alternatively, the controller 450 is coupled bi-directionally with the SoC 440 via the I2C interface and unidirectionally with the light source system 430. In both illustrations, some of the pins of the controller 450 can be electrically coupled to the buttons 410. The controller 450 can store, at different memory locations of the controller 450 (e.g., in registers) whether a button is activated and/or a current state of the button. The memory locations can be associated with corresponding I2C addresses. Further, some of the pins of the controller 450 can be configured as GPIO or GPO pins in support of I2C expanders. One or more other device components 490 can be electrically coupled to the controller 450 via such pins and can at least read some of the stored data using I2C addresses. Additionally, because the other device components 490 are coupled with the controller 450, the controller 450 can receive, for instance, an external interrupt from any of these components 490, store data related to the interrupt and/or the relevant component, and send, in turn, an interrupt to the SoC 440.

As described herein above, the buttons 410 can include a mute button operable to mute (e.g., disable) and unmute (e.g., enable) the microphone 420 and the camera 425. The mute button is coupled with the controller 450 over a data line that carries a mute button signal from the button 410 to the controller 450. Other components can be coupled on this data line including, for instance, a resistor and capacitor (R/C) circuit connected in between the button 410 and the controller 450, where this R/C circuit filters out edges of the mute button signal creating a debounce circuit with Schmitt Trigger input. The mute button can be implemented as a switch. When the switch is open, the mute button signal is set to inactive to indicate that the computing device 400 (or, equivalently, the microphone 420) should be in the enabled sensing state. In one example, when the switch is closed, the mute button signal is set to active to indicate that the computing device 400 (or, equivalently, the microphone 420) should be in the disabled sensing state instead. Inactive and active can be set by using a low voltage for inactive and a high voltage for active, or vice versa depending on the implementation.

In addition to receiving the mute button as a first input signal, the controller 450 can receive additional input signals from the other coupled buttons (including multiple button activations) or any one of the other coupled components for additional device functions (e.g., a multiple button presses for a factory reset). For instance, the controller 450 can receive a button signal from any of these buttons upon its activation and can store data related to the activation and/or the state of the button. The controller 450 can send an interrupt (e.g., as interrupt data carried by an interrupt signal) to the SoC 440. Further, from the SoC 440, the controller 450 can receive an SoC status signal and, possibly, an SoC light emission request signal and a light source intensity signal. The SoC status signal indicates a status of the SoC 440 including, for instance, where the SoC 440 is booting, the booting is complete, and the like. The SoC light emission request signal can indicate a request for a light emission by the light source 432. The light source intensity signal indicates a setting according to which the light source 432 should emit the light. In addition, the controller 450 can receive a read request from the SoC 440 requesting any of the data stored by the controller 450. A read request can identify an I2C address from which data is to be read From the light source 432, the controller 450 receives a light source voltage feedback signal indicating a voltage level at the light source 432 (e.g., at a cathode of an LED or a common cathode of an RGB LED of the light source 432). As further described in the next figures, the controller 450 can determine a failure in the light source 432 based on the voltage level (e.g., a hardware failure causing the light source 432 to emit visible light when no such mute light emission should be occurring) and can force, as applicable, the transition from the enabled sensing state to the disabled sensing state.

Based on the received input signals, the controller 450 can maintain the sensing state 452, and generate and output multiple output signals. For redundancy and higher fidelity, some of the output signals can be redundant. In addition, for a graceful termination of relevant software execution on the SoC 440, some of the output signals can be delayed relative to other output signals. In an example, the controller 450 is a dedicated microcontroller that implements logic to generate the output signals based on the input signals, where this dedicated hardware can include a microcontroller, an FPGA a PLD, a CPLD, a CPU, an SoC, and/or other circuitry that may execute firmware and/or software, where such circuitry is non-programmable, to prevent any compromise in the SoC 440 from impacting the controls of the controller 450.

In an example, the controller 450 is coupled with the light source system 430, the SoC 440, the switch set 460, and the switch set 470 over data lines that carry the output signals. To the light source 432 or a light source driver(s) 434 as applicable, the controller 450 can send a light emission signal and a light source intensity signal in the interposer configuration. In the disabled sensing state, the light emission signal indicates that the light source 432 should emit a particular visible light (e.g., red). In the enabled sensing state, the light emission signal indicates that the light source 432 should stop emitting the particular visible light. When visible light should be emitted, the light source intensity signal indicates a setting for the light emission (e.g., the power level of the light emission), where this setting can correspond to the indication from the SoC and/or can be based on an input signal from an ambient light sensor (ALS) that can be coupled with the controller 450 (e.g., as one of the other device components 490).

To the SoC 440, the controller 450 can output an interrupt signal. For instance, this interrupt signal can correspond to a change in the sensing state 452. In response, the SoC 440 can read data stored by the controller 450. This data can indicate any or a combination of a mute button activation, a state of the mute button, or the sensing state. One value of the button activation signal indicates that the mute button was activated to request the disabled sensing state. Another value of the button activation signal indicates that the mute button was activated to request the enabled sensing state. Similarly, the button state can have a value indicating that the button is activated and another value indicating that the mute button is deactivated. The sensing state can indicate whether the sensing state 452 is enabled or disabled or can indicate the change to the sensing state 452. Similar interrupt signals can be generated and sent to the SoC 440 upon another button activation and/or an external interrupt and can be followed by the SoC 440 reading the relevant data from the controller 450

To the switch set 460, the controller 450 outputs a first mute state signal and, optionally, a second mute state signal. The second mute state signal can be redundant to the first mute state signal. For instance, the second mute state signal is the complement of the first mute state signal. By using the complement, logic (e.g., implemented as logic gates) can be included in the switch set 460 to help against controls of the SoC 440 over the operations of the controller 450 and/or operations of the switch set 460. In addition, the first mute state signal (and, similarly, the second mute state signal) can be delayed by the delay time interval relative to the interrupt signal transmitted to the SoC 440. One value of the first mute state signal indicates the enabled sensing state. Another value of the first mute state signal indicates the disabled sensing state.

Upon receiving the indication from the controller 450 that the microphone 420 should be disabled (e.g., by receiving the first mute state signal and, optionally, the second mute state signal with the relevant values), the switch set 460 decouples the microphone 420 from the power source 480 and blanks the data line that couples the microphone 420 to the SoC 440. Conversely, upon receiving the indication from the controller 450 that the microphone 420 should be enabled (e.g., by receiving the first mute state signal and, optionally, the second mute state signal with the relevant values), the switch set 460 couples the microphone 420 to the power source 480 and no longer blanks the data line that couples the microphone 420 to the SoC 440.

In an example, the switch set 460 includes a power control system 462 and a data control system 464. The power control system 462 receives the first mute state signal. When the first mute state signal indicates that the microphone 420 should be disabled, the power control system 462 severs a connection between the power source 480 and the microphone 420, such as by creating an open circuit (e.g., opens a switch) on the power line that couples the power source 480 and the microphone 420, thereby powering off the microphone 420. Conversely, when the first mute state signal indicates that the microphone 420 should be enabled, the power control system 462 closes the circuit (e.g., closes the switch) on the power line that couples the power source 480 and the microphone 420, thereby powering on the microphone 420. The power control system 462 can include any of a power switch or a power regulator.

When only the first mute state signal is transmitted by the controller 450, the data control system 464 receives the first mute state signal. When redundancy is used, where the second mute state signal is also transmitted by the controller 450, the data control system 464 receives the second mute state signal instead. In both cases, when the disabled sensing state is indicated, the data control system 464 zeros the voltage level on the data line. When the enabled sensing state is indicated, no zeroing is performed, thereby the actual audio data sent by the microphone 420 is carried over the data line to the SoC 440. The data control system 464 can include any of a data switch or a set of logic gates.

To the switch set 470, the controller 450 also outputs the first mute state signal and, optionally, the second mute state signal. For instance, the one or more data lines that couple the controller 450 with the switch set 460 also couple the controller with the other switch set 470.

Upon receiving the indication from the controller 450 that the camera 425 should be disabled (e.g., by receiving the first mute state signal and, optionally, the second mute state signal with the relevant values), the switch set 470 decouples the camera 425 from the power source 480 and blanks the data line that couples the camera 425 to the SoC 440. Conversely, upon receiving the indication from the controller 450 that the camera 425 should be enabled (e.g., by receiving the first mute state signal and, optionally, the second mute state signal with the relevant values), the switch set 470 couples the camera 425 to the power source 480 and no longer blanks the data line that couples the camera 425 to the SoC 440.

In an example, the switch set 470 includes a power control system 472 and a data switch 474. The power control system 472 receives the first mute state signal. When the first mute state signal indicates that the camera 425 should be disabled, the power control system 472 severs a connection between the power source 480 and the camera 425, such as by creating an open circuit (e.g., opens a switch) on the power line that couples the power source 480 and the camera 425, thereby powering off the camera 425. Conversely, when the first mute state signal indicates that the camera 425 should be enabled, the power control system 472 closes the circuit (e.g., closes the switch) on the power line that couples the power source 480 and the camera 425, thereby powering on the camera 425. Each of one of the power control systems 462 and 472 can include any of a power switch or a power regulator.

When only the first mute state signal is transmitted by the controller 450, the data control system 474 receives the first mute state signal. When redundancy is used, where the second mute state signal is also transmitted by the controller 450, the data control system 474 receives the second mute state signal instead. In both cases, when the disabled sensing state is indicated, the data control switch 474 sets an override signal on the data line between the camera 425 and the SoC 440. Different types of overrides are possible. In one example, the override signal indicates that the camera is disabled (e.g., the override signal is a camera disable signal). In another example, the override signal can zero any video data that would have been otherwise transmitted from the camera 425 to the SoC 440 (in which case, the data line can include multiple data lines, each carrying a subset of the video data). When the enabled sensing state is indicated, no override signal is used, thereby the actual video data sent by the camera 425 is carried over the data line to the SoC 440. The data control system 474 can include any of a data switch or a set of logic gates.

In an example, the controller 450 is powered independently of the SoC 440. For instance, a first voltage rail available from the power source 480 via a first power line can provide the electrical power to the controller 450, whereas a second voltage rail available from the power source 480 via a second power line can provide the electrical power to the SoC 440. Independent power supplies enable the controller 450 and the SoC 440 to be operated in different power states. For instance, the controller 450 can be powered ON whereas the SoC 440 can be powered ON or OFF, when electrical power is available from the power source 480. The controller 450 can monitor the power state of the SoC 440 and provide different functionalities based on this power state, as further described in the next figures. For instance, if the SoC 440 is in a power OFF state, the controller 450 can trigger a change to a power ON state of the SoC 440 upon a button activation (e.g., an activation of the mute button). If the SoC 440 is in a power ON state, the controller can trigger a set of operations to be executed by the SoC upon an activation of the same button (e.g., where the mute button can be used as an action button).

As illustrated in FIGS. 3 and 4, the controller 450 can be implemented as a universal controller (e.g., as a privacy IC). Controls by the universal controller can extended to multiple sensors by coupling the universal controller to multiple switch sets, each implemented as a gating peripheral and coupled to a corresponding sensor. A first sensing signal (e.g., the herein above described first mute state signal) and, optionally for higher fidelity, a second sensing signal (e.g., the herein above described second mute state signal) are transmitted from the universal controller to each of the switch sets to control operations of these switch sets.

Figure 5:
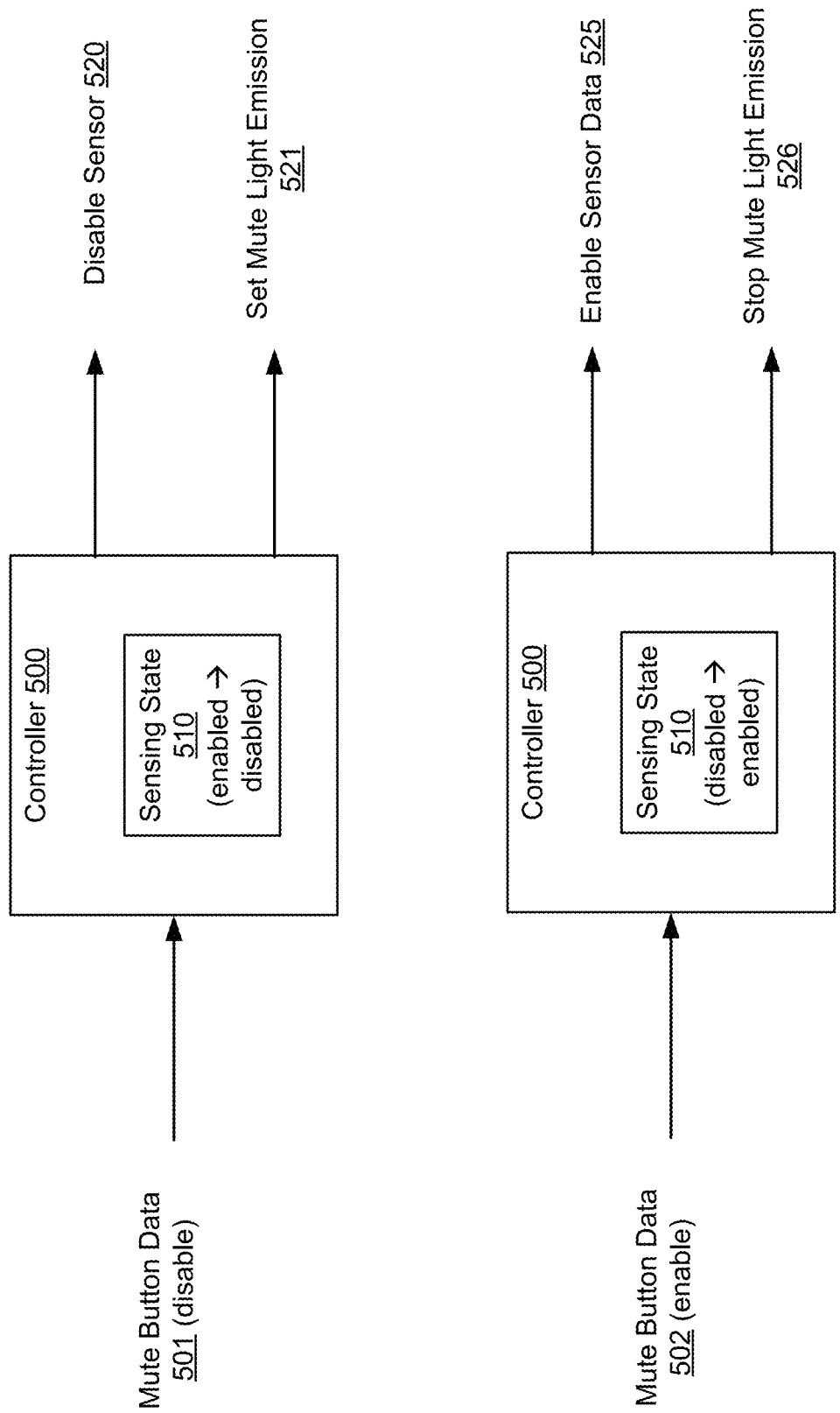
FIG. 5 illustrates an example of a diagram of a controller that controls a sensing state of a computing device based on button activations, according to embodiments of the present disclosure.

FIG. 5 illustrates an example of a diagram of a controller 500 that controls a sensing state of a computing device based on button activations, according to embodiments of the present disclosure. The controller 500 is an example of the controller 350 of FIG. 3 or the controller 450 of FIG. 4. The controller 500 maintains a sensing state 510 of the computing device. For instance, sensing state data is stored in a memory of the controller 500 and indicates whether the sensing state 510 is currently enabled or disabled. Based on activation of a mute button of the computing device and on the sensing state data, the controller 500 disables or enables a sensor (or, similarly, multiple sensors) of the computing device, causes the relevant indication of the sensing state 510, and updates the sensing state data. In an example, the indication includes emitting a particular light (e.g., mute light emission such as red light emission) to indicate the disabled sensing state and stopping the light emission otherwise. Other indications are similarly possible.

As illustrated in the top part of FIG. 5, the sensing state 510 indicates that the sensor is enabled. Mute button data 501 is received by the controller 500 upon an activation of the button. The mute button data 501 indicates a request to the disable the sensor (e.g., mute a microphone). The controller 500 determines, from the sensing state data in the memory, that the sensing state 510 is enabled. Accordingly, the controller 500 outputs data to disable 520 the sensor and to set 521 the mute light emission. Referring back to FIGS. 3 and 4, the data to disable 520 the sensor can be referred to as disable data and can be sent in a first mute state signal and, optionally, a second mute state signal to a switch set that controls the power supply to the sensor and the data transmission from the sensor. The data to set 521 the mute light emission can be referred to as light data (or LED data when LEDs are used) and can be sent as an instruction or a command to a light source system (e.g., to an LED driver) or to an SoC. In both cases, the light data can be sent over an I2C bus and can include for instance, an RGB value, or a current and pulse width modulation (PWM) percentages to control the light emission. Further, the controller 500 updates the sensing state 510 by storing updated sensing data in the memory, where the updated sensing data indicates that the sensor is disabled (e.g., indicates that the sensing state 510 is now disabled).

As illustrated in the bottom part of FIG. 5, the sensing state 510 is disabled. Mute button data 502 is received by the controller 500 upon an activation of the button. The mute button data 502 indicates a request to the enable the sensor (e.g., unmute the microphone). The controller 500 determines, from the sensing state data in the memory, that the sensing state 510 is disabled. Accordingly, the controller 500 outputs data to enable 525 the sensor and to stop 526 the mute light emission. Referring back to FIGS. 3 and 4, the data to enable 525 the sensor can be referred to as enable data and can be sent in the first mute state signal and, optionally, the second mute state signal to the switch set. The light data to stop 525 the mute light emission can be sent as an instruction or a command to the light source system (e.g., to the LED driver) in the interposer configuration or to the SoC in the passive sniffer configuration. Further, the controller 500 updates the sensing state 510 by storing updated sensing data in the memory, where the updated sensing data indicates that the sensor is enabled (e.g., indicates that the sensing state 510 is now enabled).

Figure 6:
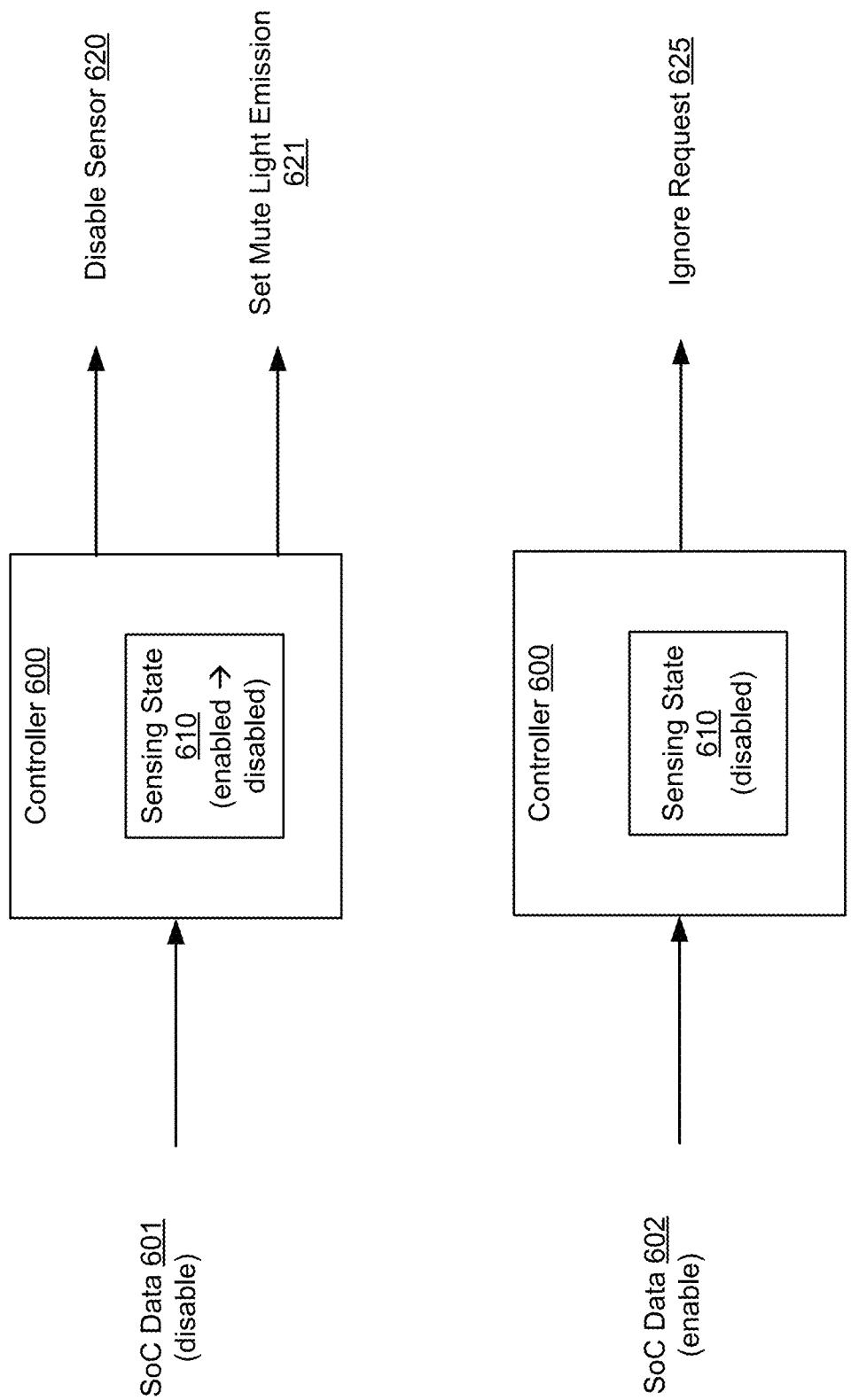
FIG. 6 illustrates an example of a diagram of a controller that controls a sensing state of a computing device based on system on a chip (SoC) requests, according to embodiments of the present disclosure.

FIG. 6 illustrates an example of a diagram of a controller 600 that controls a sensing state of a computing device based on system on SoC requests, according to embodiments of the present disclosure. The controller 600 is an example of the controller 350 of FIG. 3 or the controller 450 of FIG. 4. The controller 600 maintains a sensing state 610 of the computing device, similar to the sensing state 510 of FIG. 5. An SoC of the computing device may disable a sensor (or, similarly, multiple sensors) and the controller 600 can provide the relevant controls for the disabling. However, the SoC may not re-enable the sensor. Instead, and as further described in FIG. 7, a button activation is used.

As illustrated in the top part of FIG. 6, the sensing state 610 indicates that the sensor is enabled. SoC data 601 is received by the controller 600 and indicates a request of the SoC to disable a sensor (e.g., mute a microphone). This request can be made based on execution of program code on the SoC, where the program code can generate an instruction for the disabling. The controller 600 determines, from the sensing state data in the memory, that the sensing state 610 is enabled. Accordingly, the controller 600 outputs data to disable 620 the sensor and to set 621 the mute light emission. Further, the controller 600 updates the sensing state 610 by storing updated sensing data in the memory, where the updated sensing data indicates that the sensor is disabled (e.g., indicates that the sensing state 610 is now disabled).

As illustrated in the bottom part of FIG. 6, the sensing state 610 is disabled. SoC data 602 is received by the controller 600 and indicates a request of the SoC to enable the sensor (e.g., unmute the microphone). This request can be made based on execution of the program code or another program code on the SoC, where the executed program code can generate an instruction for the enabling. The controller 600 determines, from the sensing state data in the memory, that the sensing state 610 is disabled. Because the request to re-enable the sensor is from the SoC and is not based on a mute button activation, the controller 600 ignores 625 the request. Therefore, the sensor remains disabled, and the sensing state data is not updated.

Figure 7:
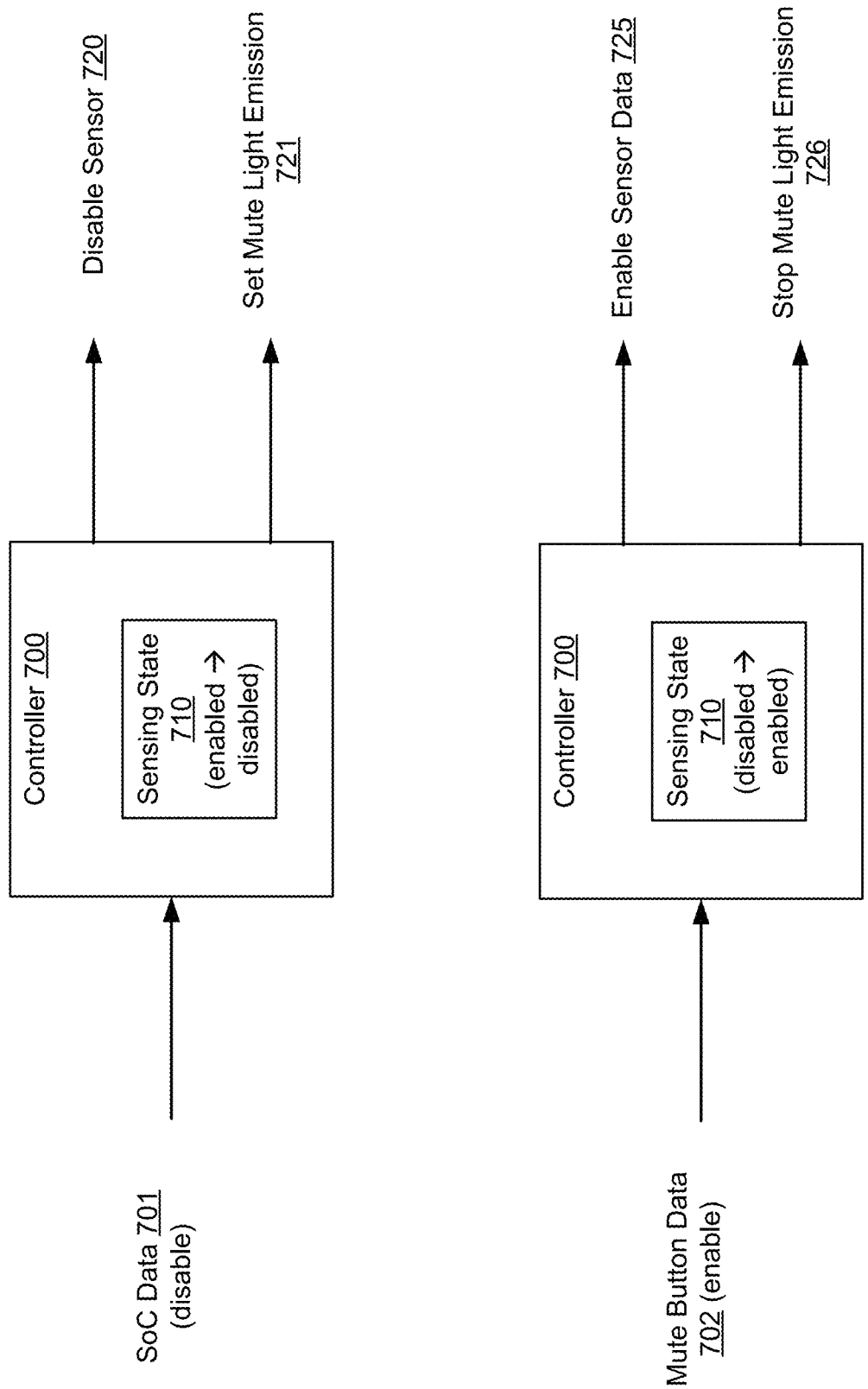
FIG. 7 illustrates an example of a diagram of a controller that controls a sensing state of a computing device based on an SoC request to disable a sensor and a mute button activation to enable the sensor, according to embodiments of the present disclosure.

FIG. 7 illustrates an example of a diagram of a controller 700 that controls a sensing state of a computing device based on an SoC request to disable a sensor and a mute button activation to enable the sensor, according to embodiments of the present disclosure. The controller 700 is an example of the controller 350 of FIG. 3 or the controller 450 of FIG. 4. The controller 700 maintains a sensing state 710 of the computing device, similar to the sensing state 510 of FIG. 5. An SoC of the computing device may disable the sensor (or, similarly, multiple sensors) and the controller 700 can provide the relevant controls for the disabling. A mute button activation may re-enable the sensor.

As illustrated in the top part of FIG. 7, the sensing state 710 indicates that the sensor is enabled. SoC data 701 is received by the controller 700 and indicates a request of the SoC to disable a sensor (e.g., mute a microphone). The controller 700 determines, from the sensing state data in the memory, that the sensing state 710 is enabled. Accordingly, the controller 700 outputs data to disable 720 the sensor and to set 721 the mute light emission. Further, the controller 700 updates the sensing state 710 by storing updated sensing data in the memory, where the updated sensing data indicates that the sensor is disabled (e.g., indicates that the sensing state 710 is now disabled).

As illustrated in the bottom part of FIG. 7, the sensing state 710 is disabled. Mute button data 702 is received by the controller 700 upon an activation of a mute button. The mute button data 702 indicates a request to the enable the sensor (e.g., unmute the microphone). The controller 700 determines, from the sensing state data in the memory, that the sensing state 710 is disabled. Because the mute button data 702 is received from the mute button and because the sensing state is currently disabled, the controller 700 outputs data to enable 725 the sensor and to stop 726 the mute light emission. Further, the controller 700 updates the sensing state 710 by storing updated sensing data in the memory, where the updated sensing data indicates that the sensor is enabled (e.g., indicates that the sensing state 710 is now enabled).

Figure 8:
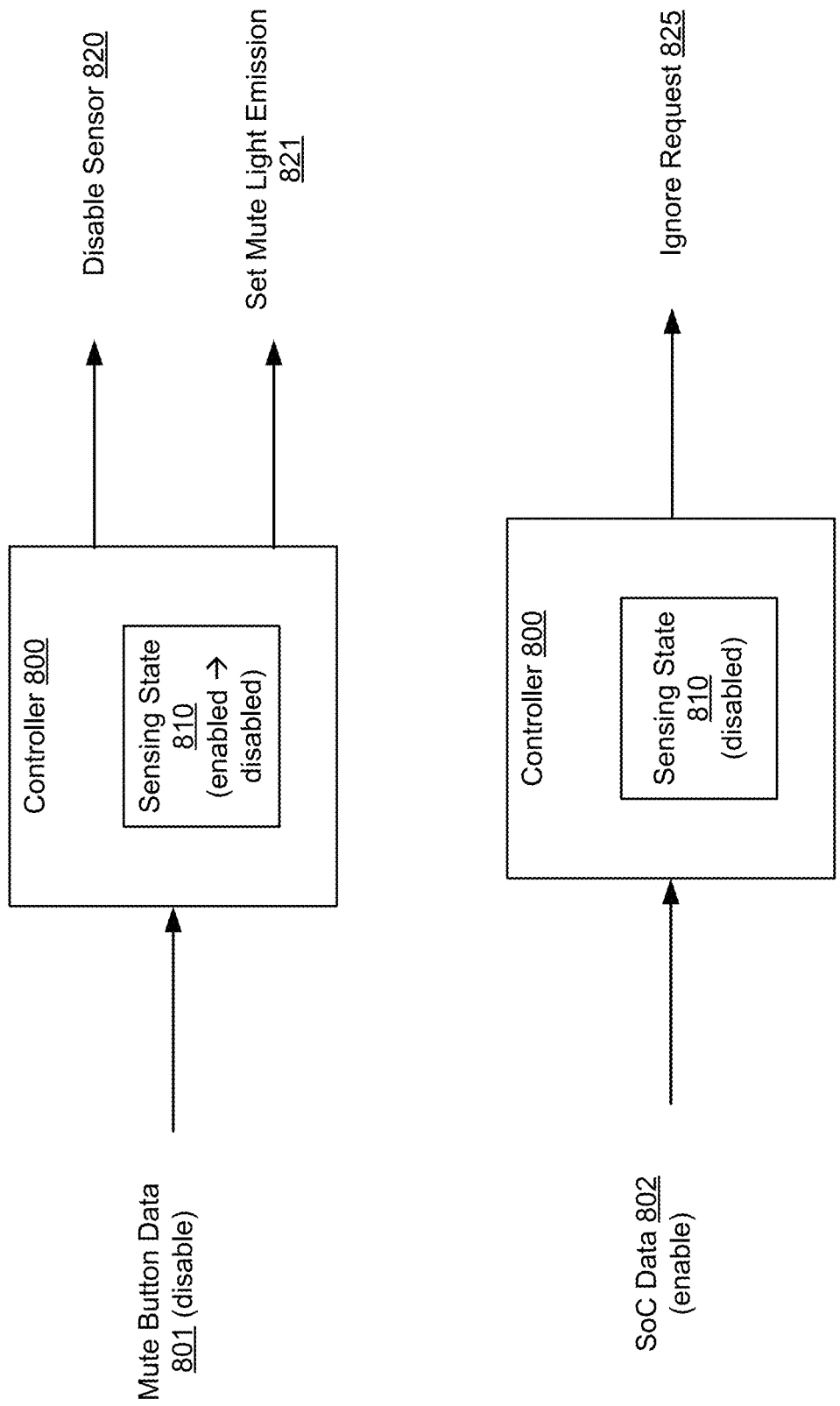
FIG. 8 illustrates an example of a diagram of a controller that controls a sensing state of a computing device based on button activation to disable the sensor and an SoC request to enable the sensor, according to embodiments of the present disclosure.

FIG. 8 illustrates an example of a diagram of a controller 800 that controls a sensing state of a computing device based on button activation to disable a sensor and an SoC request to enable the sensor, according to embodiments of the present disclosure. The controller 800 is an example of the controller 350 of FIG. 3 or the controller 450 of FIG. 4. The controller 800 maintains a sensing state 810 of the computing device, similar to the sensing state 510 of FIG. 5. A mute button of the computing device may disable the sensor (or, similarly, multiple sensors) and the controller 800 can provide the relevant controls for the disabling. However, an SoC of the computing device may not re-enable the sensor and instead, a mute button activation is used.

As illustrated in the top part of FIG. 8, the sensing state 810 indicates that the sensor is enabled. Mute button data 801 is received by the controller 800 upon an activation of the mute button. The mute button data 801 indicates a request to the disable the sensor (e.g., mute a microphone). The controller 800 determines, from the sensing state data in the memory, that the sensing state 810 is enabled. Accordingly, the controller 800 outputs data to disable 820 the sensor and to set 821 the mute light emission. Further, the controller 800 updates the sensing state 810 by storing updated sensing data in the memory, where the updated sensing data indicates that the sensor is disabled (e.g., indicates that the sensing state 810 is now disabled).

As illustrated in the bottom part of FIG. 8, the sensing state 810 is disabled. SoC data 802 is received by the controller 800 and indicates a request of the SoC to enable the sensor (e.g., unmute the microphone). This request can be made based on execution of program code on the SoC, where the program code can generate an instruction for the enabling. The controller 800 determines, from the sensing state data in the memory, that the sensing state 810 is disabled. Because the request to re-enable the sensor is from the SoC and is not based on a mute button activation, the controller 800 ignores 825 the request. Therefore, the sensor remains disabled, and the sensing state data is not updated.

Figure 9:
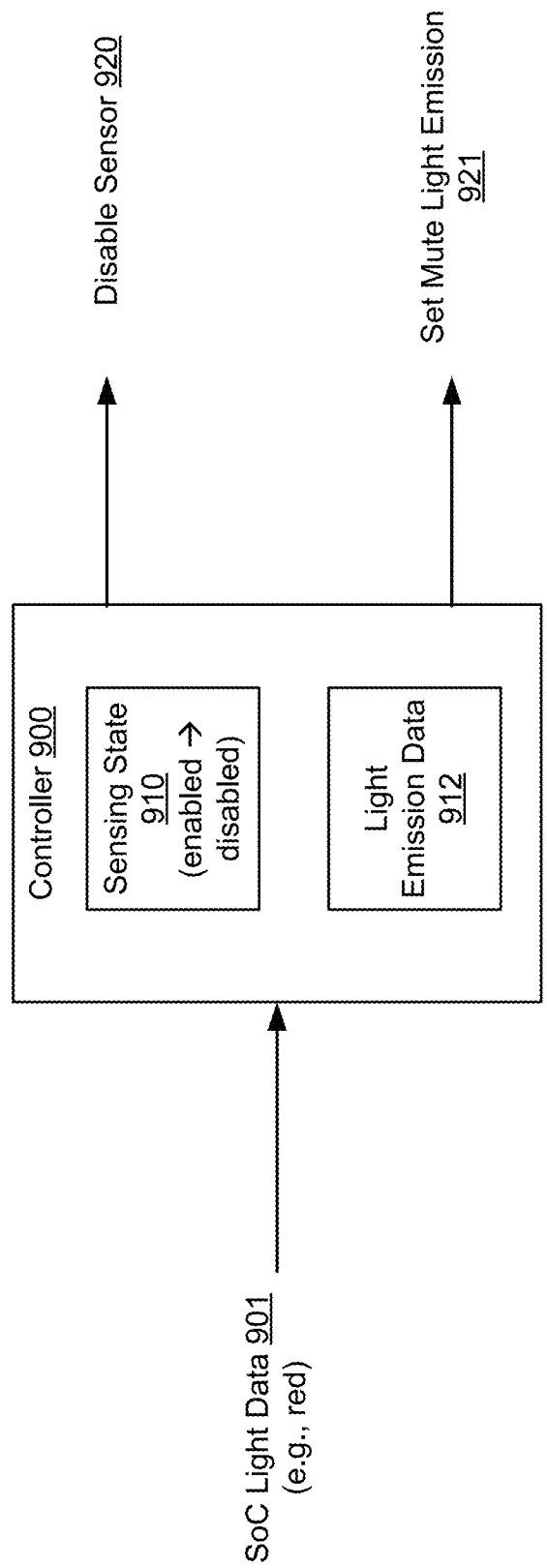
FIG. 9 illustrates an example of a diagram of a controller that controls a sensing state and light emission of a computing device based on an SoC light emission request, according to embodiments of the present disclosure.

FIG. 9 illustrates an example of a diagram of a controller 900 that controls a sensing state and light emission of a computing device based on an SoC light emission request, according to embodiments of the present disclosure. The controller 900 is an example of the controller 350 of FIG. 3 or the controller 450 of FIG. 4. The controller 900 maintains a sensing state 910 of the computing device, similar to the sensing state 510 of FIG. 5. Here, when the sensor is disabled, a particular light emission is used to indicate the disabled sensing state (e.g., red light). If a request for light emission is made by the SoC for any other light color, the controller 900 can ignore this request as long as the sensing state 910 is set to disabled. In the enabled sensing state, the light emission request of the SoC can be further processed, where the controller 900 compares the requested light emission (e.g., the requested light color) with the mute light emission that indicates the disabled sensing state. If the result of the comparison indicates possible user confusion (e.g., the requested light color is the same, such as by being also red, or is similar enough, such as being a cherry color), the controller 900 disables the sensor and emits the requested light or the one used to indicate the disabled sensing state. The similarity comparison between the light emissions can rely on light emission data 912 stored in the memory of the controller 900.

Various types of the light emission data 912 are possible. In an example, the light emission data 912 stores an RGB value range of light colors that are similar to the one used to indicate the disabled sensing state. In this case, the data received from the SoC to request a light emission includes an RGB value that is then compared to the RGB value range and, if within this range, the controller 900 transitions to the disabled sensing state. In another example, the light emission data stores a range of current and/or PWM percentages that, when used to emit light, would result in light emissions similar to the one used to indicate the disabled sensing state. In this case, the data received from the SoC to request a light emission includes a current value and/or PWM percentages that are then compared to the current and/or PWM percentage range and, if within this range, the controller 900 transitions to the disabled sensing state.

In the illustration of FIG. 9, the light emission used to indicate the disabled sensing state involves red light. The sensing state 910 is enabled. SoC light data 901 is received by the controller 900 from the SoC and indicates a request to emit red light. Based on a comparison of SoC light data 901 with the light emission data 912 and based on the sensing state 910 being currently enabled, the controller 900 disables 920 the sensor and sets 921 the mute light emission. Further, the controller 900 updates the sensing state 910 by storing updated sensing data in the memory, where the updated sensing data indicates that the sensor is disabled (e.g., indicates that the sensing state 910 is now disabled).

Figure 10:
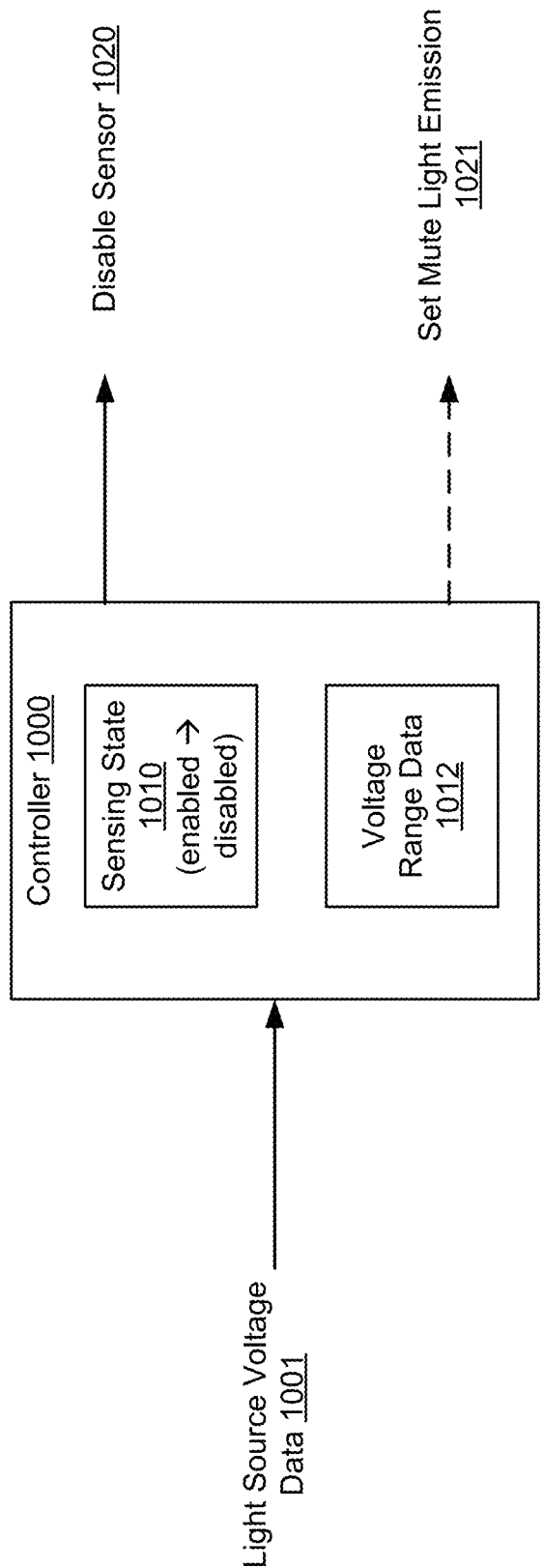
FIG. 10 illustrates an example of a diagram of a controller that controls a sensing state of a computing device based on light source voltage feedback, according to embodiments of the present disclosure.

FIG. 10 illustrates an example of a diagram of a controller 1000 that controls a sensing state of a computing device based on light source voltage feedback, according to embodiments of the present disclosure. The controller 1000 is an example of the controller 350 of FIG. 3 or the controller 450 of FIG. 4. The controller 1000 maintains a sensing state 1010 of the computing device, similar to the sensing state 510 of FIG. 5. Here, when the sensor is disabled, a particular light is emitted by a light source to indicate the disabled sensing state (e.g., mute light emission such as red light emission). If in the enabled sensing state, the light source emits the particular light (e.g., red light) due to a fault at the light source, the controller 1000 disables the sensor until, for instance, the fault is cleared, the computing device is restarted, and/or a particular button activation (e.g., a push and hold for some predefined amount of time) is detected.

In an example, the fault is detected based on voltage measurements at the light source. The controller 1000 can compare one or more measured voltage values to voltage range data 1012. The voltage range data 1012 can be stored in the memory of the controller 1000 and can indicate a range of voltage values associated with a light emission fault of the light source. For instance, if a measured voltage value is within this range, a fault likely exists. Conversely, the voltage range data 1012 can indicate a range of voltage values associated with normal operations of the light source. In this case, if a measured voltage value is outside this range, a fault likely exists, and the sensing state needs to be updated to disabled.

Different approaches can be used to measure voltage at the light source. For instance, the light source includes a plurality of LEDs or sets of RGB LEDs. A voltage can be measured per LED at the cathode of the LED. Additionally or alternatively, a voltage can be measured per RGB LED at a common cathode of the red, blue, and green LEDs. Further, the controller 1000 can monitor the voltages in parallel at a particular monitoring rate (e.g., between four-hundred kilohertz and two megahertz). Alternatively, the voltages can be monitored sequentially or in a particular pattern at the particular monitoring rate. The monitoring rate can also be dynamic. For instance, upon detection of a likely fault, the controller 1000 can increase the monitoring rate.

Furthermore, different approaches can be used to determine a fault and transition into the disabled sensing state. In one example, if a minimum number (e.g., one) of the measured voltage values are within the fault voltage range (or, conversely, outside of the normal operational voltage range), the controller 1000 declares a fault and causes the transition. In another example, a certain percentage of the measured values have to indicate the fault (e.g., thirty percent or some other percentage value) for the transition. In yet another example, a time dimension may be added, where if a measured voltage value(s) indicates a likely fault for at least a predefined time duration (e.g., one second), the controller 1000 declares a fault and causes the transition.

In the illustration of FIG. 10, the controller 1000 receives light source voltage data 1001 at the particular monitoring rate, where this data 1001 indicates measured voltage values at the light source. The sensing state 1010 is enabled. The controller 1000 compares the voltage values indicated by the light source voltage data 1001 to the voltage value range defined in the voltage range data 1012. When the comparison indicates a light emission fault, the controller 1000 disables 1020 the sensor and, optionally as indicated with the dashed arrow, sets 1021 the mute light emission (e.g., if one RGB LED was faulty, the light emission is set such that all RGB LED emit the red light). Further, the controller 1000 updates the sensing state 1010 by storing updated sensing data in the memory, where the updated sensing data indicates that the sensor is disabled (e.g., indicates that the sensing state 1010 is now disabled).

The light source voltage data 1001 is an example of light source data fed back from the light source to the controller 1000 and indicating a mode of operation of the light source. Other types of light source data are possible including, for instance, feedback data indicating an electrical current value, an electrical power value, and the like. A vale indicated by the light source data can be compared to an operational range of values. If within the range, the controller 1000 can determine that the light source is operating in a normal mode. If outside the range, the controller 1000 can determine that the light source is operating in a failure mode (e.g., is outputting red light or some other light indicating that the sensor is disabled when, in fact, the sensor is enabled).

Figure 11:
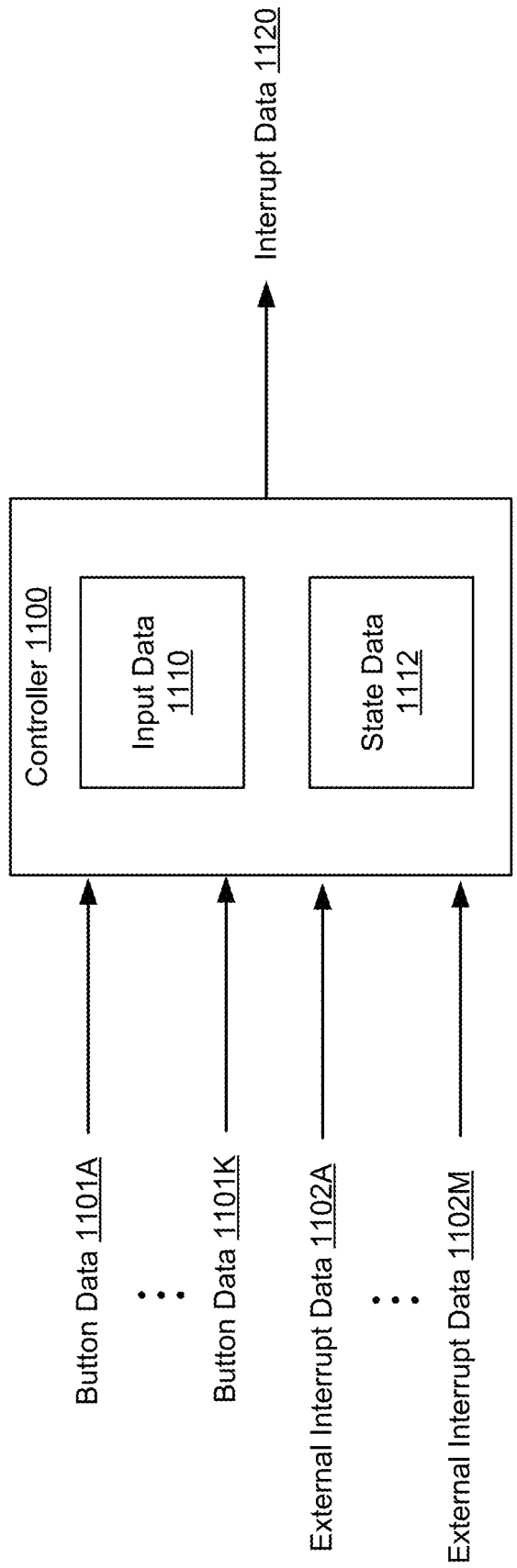
FIG. 11 illustrates an example of a diagram of a controller that generates interrupts data for an SoC, according to embodiments of the present disclosure.

FIG. 11 illustrates an example of a diagram of a controller 1100 that generates interrupts data for an SoC, according to embodiments of the present disclosure. The controller 1100 is an example of the controller 350 of FIG. 3 or the controller 450 of FIG. 4. The controller 1100 maintains input data 1110 related to one or more buttons coupled with the controller 1100 and/or one or more device components also coupled with the controller 1100. The controller 1100 also maintains state data 1112 corresponding to the button(s) and/or the device component(s).

For example, "K" buttons and "M" device components are coupled with the controller 1100, where "K" and "M" are positive integers. Accordingly, the controller 1100 can receive "K" button data 1101A through 1101K and "M" external interrupt data 1102A through 1102M. Each button data 1101A through 1101K can correspond to a button of the "K" buttons and can indicate a signal received from the button (e.g., a low signal "L" indicating that a button has been activated or a high signal "H" indicating that the button has been deactivated). The corresponding input data can indicate that the signal was received, and this indication can be stored in a memory location associated with the button. Each external interrupt data A 1102A through 1102M can correspond to a device component of the "M" device components and can indicate that an external interrupt is received from the device component. The corresponding input data can indicate that the external interrupt signal was received, and this indication can be stored in a memory location associated with the device component.

The state data 1112 can indicate, for each button, a state thereof. A button state of can indicate whether the corresponding button has been activated or deactivated. It may also be possible to store state data indicating, per device component, a state of the device component. A device component state can whether the corresponding device component is activated, is running, is in a power save mode, an operational mode thereof, and the like.

The controller 1100 can implement one or more OR logics to generate interrupt data 1120. For instance, if any of the buttons has been activated (e.g., as indicated by any of button data 1101A through 1101K) or any external interrupt has been received (e.g., as indicated by any of the external interrupt data 1102A through 1102M), the controller 1100 generates and outputs the interrupt data 1120. Additionally or alternatively, if the state data 1112 indicates a change to any of the button states, the controller 1100 generates and outputs the interrupt data 1120.

The interrupt data 1120 can be sent to an SoC. In response, the SoC can request and read, from the controller 1100, any of the input data 1110 and/or the state data 1112. Upon a determination that a mute button has been activated, the SoC can request and read, from the controller 1100, a sensing state of a sensor.

Figure 12:
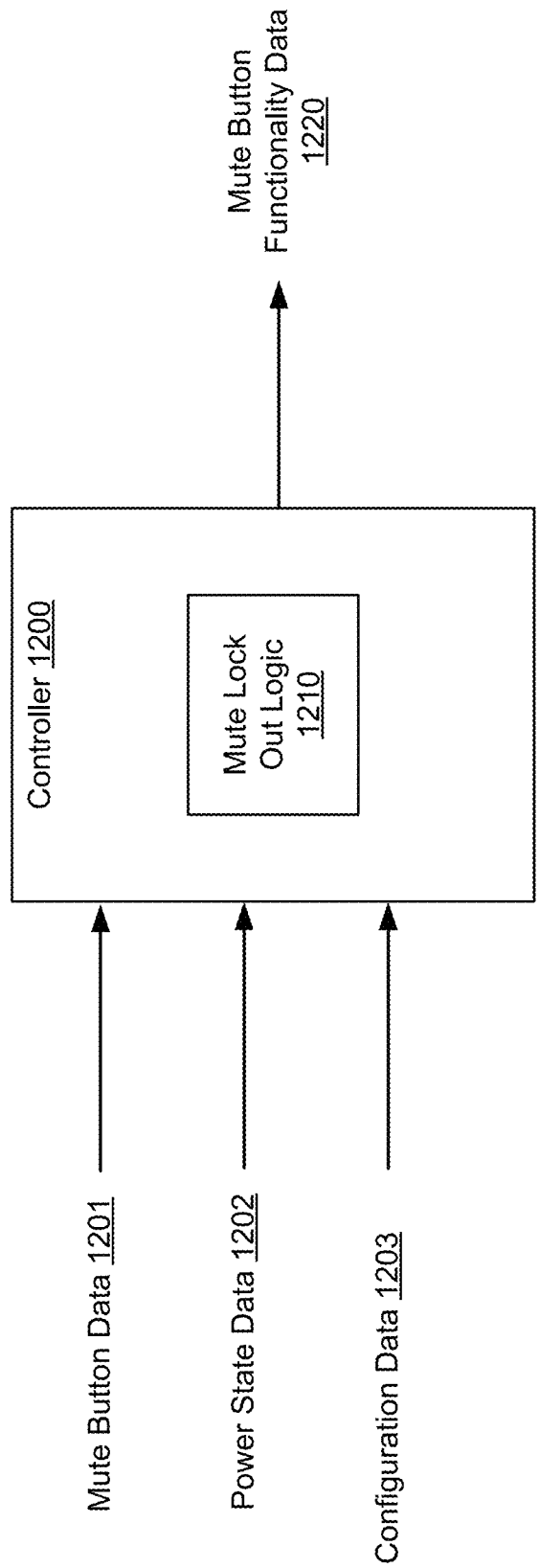
FIG. 12 illustrates an example of a diagram of a controller that controls a functionality of a mute button, according to embodiments of the present disclosure.

FIG. 12 illustrates an example of a diagram of a controller 1200 that controls a functionality of a mute button, according to embodiments of the present disclosure. The controller 1200 is an example of the controller 350 of FIG. 3 or the controller 450 of FIG. 4. The controller 1200 implements mute lock out logic 1210 (e.g., as a set of software instructions and/or hardware circuitry) to control functionality of a mute button. For instance, the functionality can be set to allow only the enabling or disabling of a sensor or the functionality can be expanded to also allow the mute button to be used as an action button (e.g., to power OFF and ON a computing device). The control can be based on a power state and/or a configuration of the computing device.

As illustrated in FIG. 12, the controller 1200 receives mute button data 1201. The mute button data 1201 indicates whether a mute button is activated or deactivated and/or a state of the mute button, as described herein above. Further, the mute button data 1201 can indicate whether an activation of the mute button (e.g., a press) exceeds a predefined time period (e.g., the mute button is maintained in the pressed position for more than 3 seconds). The controller 1200 can also receive power state data 1202 indicating a power state associated with one or more device components of the computing device. For instance, the power state data 1202 can be implemented as part of a multi-modal gating function that indicates whether a supply voltage has dropped below a threshold voltage. The supply voltage can be to the computing device or a device component thereof (e.g., an SoC of the computing device). Further, the controller 1200 also receives configuration data 1203 indicating a configuration of the computing device (e.g., whether the computing device is multi-modal or not). Any or all of the mute button data 1201, power state data 1202, or configuration data 1203 can be stored by the controller 1200 (e.g., in corresponding memory locations of the controller 1200, where these memory locations have corresponding I2C memory addresses).

The mute button data 1201, power state data 1202, and configuration data 1203 can be input to the mute lock out logic 1210. In turn, the mute lock out logic 1210 can output an indication about the functionality of the mute button that is to be enabled or disabled. Accordingly, the controller 1200 can generate mute button functionality data 1220 indicating the functionality that is to be enabled or disabled. The button functionality data 1220 can be stored locally by the controller 1200 (e.g., in a memory location also having a corresponding I2C address).

In an example, the configuration data 1203 indicates that the computing device is not multi-modal. In this example, the enabled functionality is for using the mute button as only a mute button. If the power state indicates an ON power state, if the mute button data 1201 indicates that the mute button is activated, the controller 1200 can cause a sensor to be disabled or enabled (depending on the current sensing state). If the power state indicates an OFF power state, the controller 1200 may not change the sensing stat regardless of the mute button data 1201.

In another example, the configuration data 1203 indicates that the computing device is multi-modal. In this example, the enabled functionality can include using the mute button as only a mute button or also using the mute button as an action button. For instance, if the power state indicates an ON power state, if the mute button data 1201 indicates that the mute button is activated for a period of time longer than a threshold value (e.g., 3 seconds), the controller 1200 can indicate that the power state is to be changed to an OFF power state. Otherwise, the controller 1200 can cause a sensor to be disabled or enabled (depending on the current sensing state). If the power state indicates an OFF power state, and if the mute button data 1201 indicates that the mute button is activated (e.g., even for a period of time shorter than the threshold value), the controller 1200 can indicate that the power state is to be changed to an ON power state, but the sensing state is to be maintained (e.g., the mute button is not used to change the sensing state). Otherwise, the controller 1200 can indicate that no change to the power state or the sensing state is needed.

Figure 13:
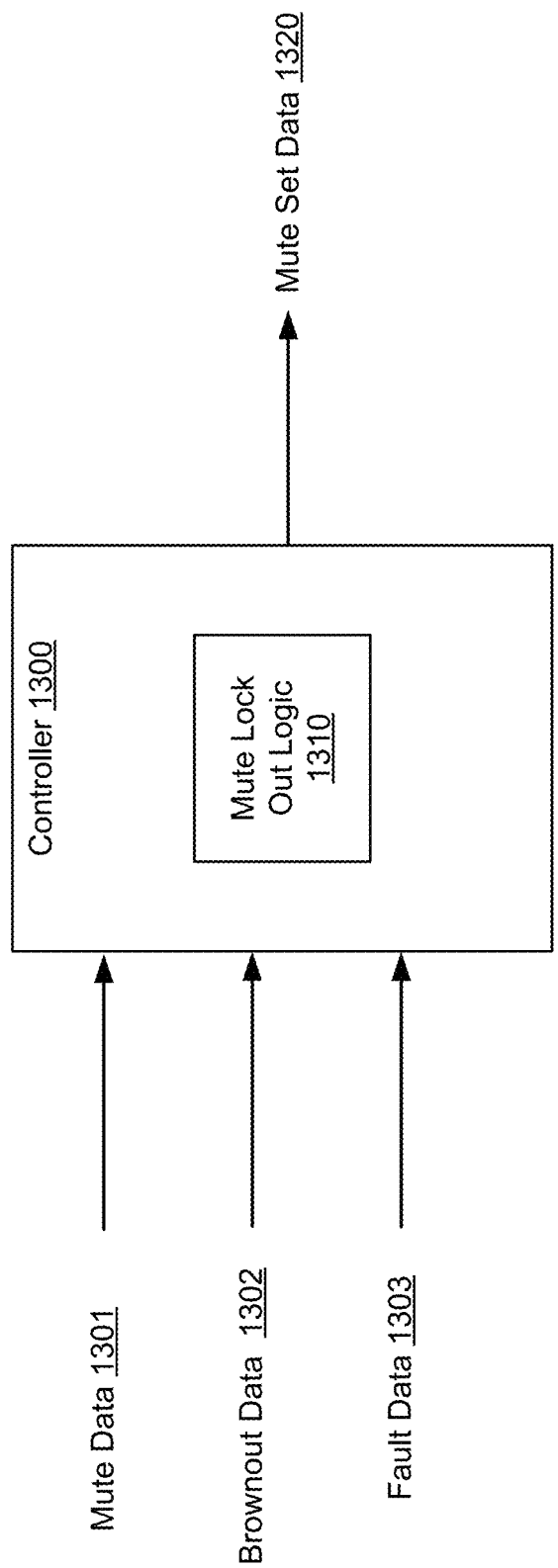
FIG. 13 illustrates an example of a diagram of a controller that controls a mute functionality of a computing device, according to embodiments of the present disclosure.

FIG. 13 illustrates an example of a diagram of a controller 1300 that controls a mute functionality of a computing device, according to embodiments of the present disclosure. The controller 1300 is an example of the controller 350 of FIG. 3 or the controller 450 of FIG. 4. The controller 1300 implements mute lock out logic 1310 (e.g., as a set of software instructions and/or hardware circuitry) to control functionality of the computing device. For instance, the functionality can be set to prevent the disabling of a sensor while a voltage brownout is detected and/or to force the disabling of the sensor while a light source failure is detected.

As illustrated in FIG. 13, the controller 1300 receives mute data 1301. The mute data 1301 indicates whether a sensor is muted (or, more generally, disabled) or, equivalently, whether a sensing state of the sensor (or the computing device) is disabled. For example, the mute data 1301 can correspond to either one or both of the first mute state signal and the second mute state signal described in connection with FIGS. 3-4. The controller 1300 can also receive brownout data 1302 indicating whether a voltage level associated with the computing device (e.g., an operating voltage of the computing device or any component thereof, such as an SoC) has dropped below a threshold value. For instance, this indication can be implemented as part of a brownout monitoring circuit of the controller 1300. Further, the controller 1300 also receives fault data 1303 indicating a failure at one or more light sources. For instance, the fault data 1303 is generated based on a comparisons of voltage level indicated by light source voltage data 1001 to a threshold value, as described in connection with FIG. 10, and indicates whether the failure is detected or not. Any or all of the mute data 1301, brownout data 1302, or fault data 1303 can be stored by the controller 1300 (e.g., in corresponding memory locations of the controller 1300, where these memory locations have corresponding I2C memory addresses).

The mute data 1301, brownout data 1302, or fault data 1303 can be input to the mute lock out logic 1310. In turn, the mute lock out logic 1310 can output an indication about the functionality of the computing device that is to be enabled or disabled. Accordingly, the controller 1300 can generate mute set data 1320 indicating the functionality that is to be enabled or disabled. The mute set data 1320 can be stored locally by the controller 1300 (e.g., in a memory location also having a corresponding I2C address).

In an example, the brownout data 1302 indicates that no voltage brownout is detected. In this example, the enabled functionality is for enabling a change to the sensing state of the computing device (e.g., to disable the sensor upon an activation of a mute button, or any other changes as described in FIGS. 5-8). However, if the fault data 1303 indicates that the failure is detected, the change to the sensing state can be limited. In particular, the sensing state can be forced to become disabled if it is currently enabled or to remain disabled otherwise, as described in connection with FIG. 10.

In another example, the brownout data 1302 indicates that no voltage brownout is detected. In this example, if the sensing state is currently enabled or disabled, the controller 1300 can prevent a change to the sensing state (e.g., upon an activation of a mute button, or any other changes as described in FIGS. 5-8). However, if the fault data 1303 indicates that the failure is detected, the controller 1300 may force the disabling sensing state.

Referring back to FIGS. 5-13, receiving data by a controller can include receiving digital data. Additionally or alternatively, an analog signal can be received, and the controller can digitize it (e.g., where the controller includes an analog-to-digital converter). Sending data by the controller can include sending digital data. Additionally or alternatively, an analog signal can be output (e.g., where the controller includes an analog-to-digital converter).

A controller can store different types of data. Each type of data can be stored in a memory location of the controller. Each memory location can have an address, such as an I2C address. Some or all of the stored data can be read only by using the corresponding memory addresses. Alternatively, some of the data can be written to the memory by an external device component (e.g., the light emission data 912 can be updated by using a write to the memory address corresponding to the memory location where the light emission data 912 is stored).

Also referring back to FIGS. 5-13, a sensing state, a mute button functionality, and/or other mute-related functionality can persist over time, including when a computing device is powered off and restarted. For instance, prior to being powered OFF, the computing device is in a particular sensing state and the mute button is configured to have a particular functionality (e.g., mute only). Upon a restart, a controller can control the sensor to be in the particular sensing state and can enable the particular functionality of the mute button. Data persistence can be implemented by using a particular type of data storage, such as non-volatile computer memory storage medium (e.g., a Flash memory).

Various embodiments of the present disclosure are described in connection with a sensing state of a sensor and sensing state data. The sensing state is an example of a state of the sensor and the sensing state data is an example of state data that indicates whether a sensing state of a sensor is enabled or disabled. Embodiments of the present disclosure are not limited to sensing state and sensing state data and similarly apply to any type of state and/or any type of state data. For instance, a sensor can be controlled to be enabled or disabled, active or inactive (e.g., powered on and outputting sensor data, or powered on but its output is blanked), low power mode or high power mode (e.g., set to a particular voltage level or current draw that may impact the sensing capability), or low sensing range or a high sensing range (e.g., the specific sensing capability), and the like. State data can indicate each of these states.

Referring back to FIGS. 5-13, the sensing state of a sensor of a computing device can be maintained through a power cycle (e.g., by being stored in a non-volatile memory of a controller). For instance, if the sensor was disabled and the computing device is powered OFF then ON again, the sensing state can still be the disabled sensing state upon the powering ON of the device. Similarly, some or all of the state data of the different buttons can be maintained through the power cycle.

Figure 14:
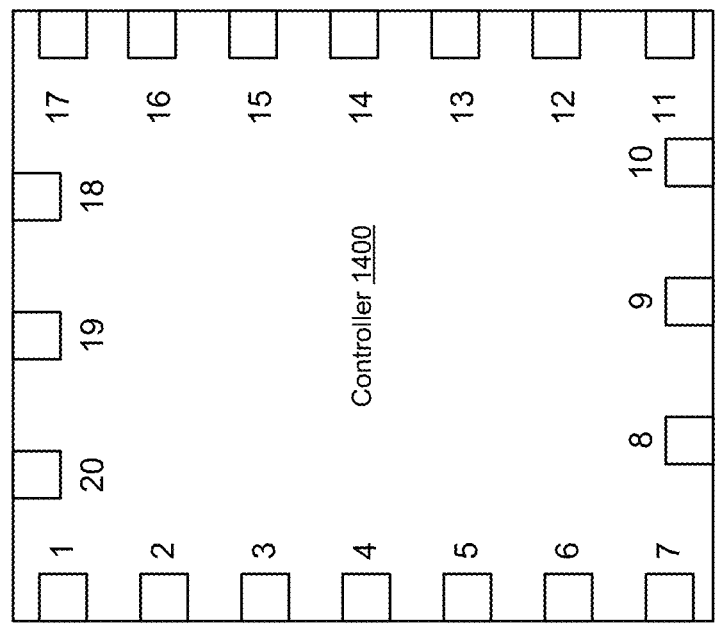
FIG. 14 illustrates an example of a pinout of a controller, according to embodiments of the present disclosure.

FIG. 14 illustrates an example of a pinout of a controller 1400, according to embodiments of the present disclosure. The controller 1400 is one example implementation that uses, for instance, a CPLD design for the functionalities described in connection with FIGS. 5-13.

As illustrated, the pinout includes twenty pins, numbered "1" through "20." Pin "1" can be connected to a voltage rail of the computing device, where the voltage rail provides an operating voltage $V_{DD}$ to the controller 1400. Each of pin "2," "3," and "4" can be connected to a mute button, a volume up button, and a volume down button, respectively. Pin "5" can be connected to a device component that may be configured to send an external interrupt to the control 1400. Pin "6" can be connected to one or more circuits, such as one or voltage divider circuits, that in turn are connected to more or more voltage rails. An example of such voltage rails can include the voltage rail providing the operating voltage $V_{DD}$ to the controller 1400 or the same or a different voltage rail providing an operating voltage $V_{DD}$ to an SoC of the computing device. The output of the voltage divider(s) can be a monitored operating voltage $V_{DD\_monitored}$ that is within a predefined voltage value range. Pin "7" can be connected to a light source driver that provide a PWM value to the controller 1400. Pin "8" can receive an I2C serial clock (SCL) signal, whereas pin "9" can be connected to an I2C data line (SDA). Pins "10" and "12" can be an output pin connected to the LED driver, whereas pin "11" can be connected to the ground. Pin "13" can be connected to a cathode of an LED (or a set of cathodes corresponding to a set of LEDs) to monitor LED failure(s). Pin "14" can be connected to a switch that can power ON the LED(s). Pin "15" can be connected to a voltage rail that provides a supply voltage $V_{CC}$ to one or more external components of the computing device, such as the controller 1400 or the SoC. Pins "16" and "18" can be used as I2C expanders by being connected to one or more device components. Pin "17" can be used as an output pin that provides an interrupt to, for instance, the SoC. Pins "19" and "20" can output a mute state signal and the complement of the mute state signal.

Figure 15:
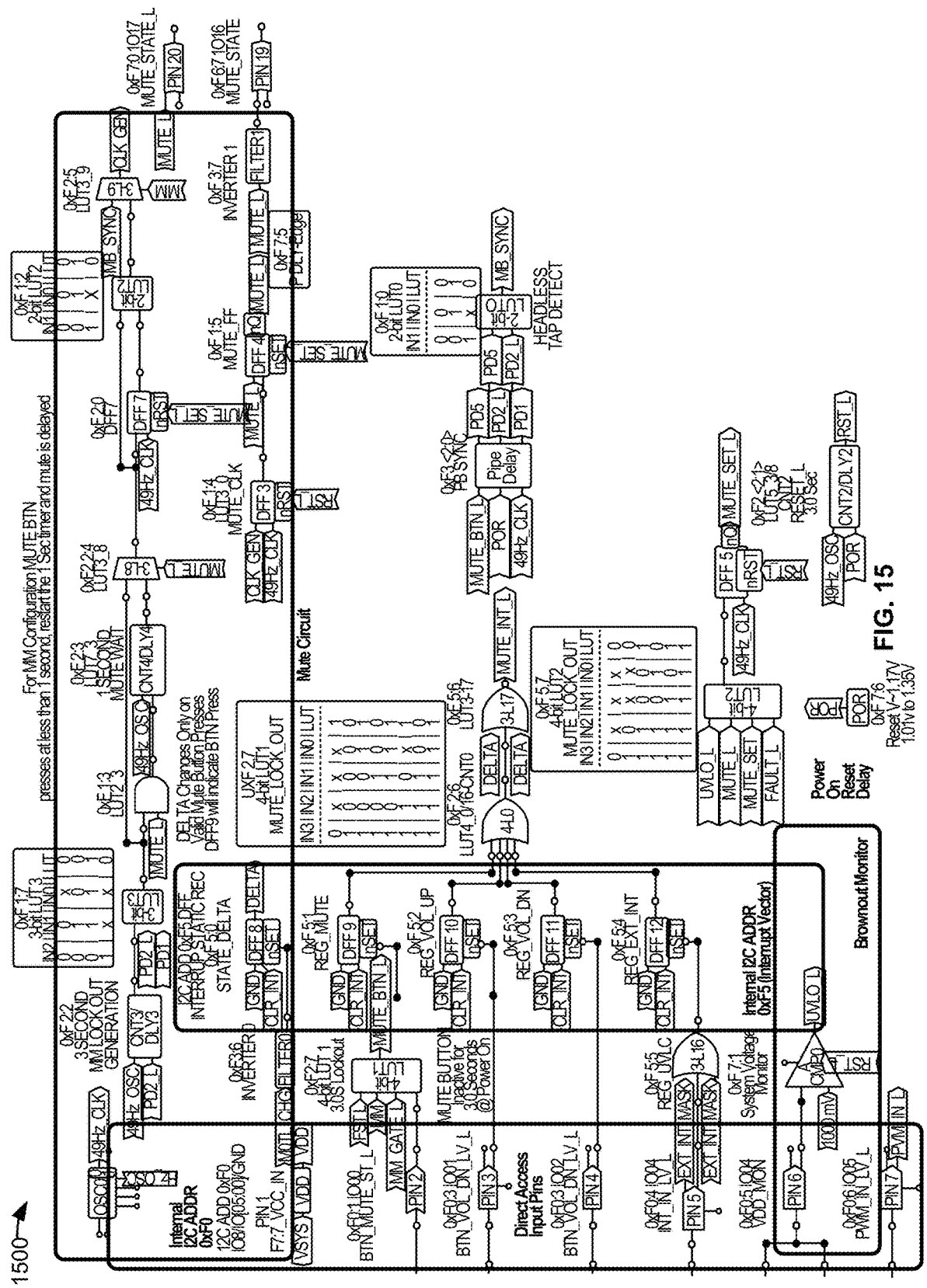
FIG. 15 illustrates an example of a first portion of a circuit implementation of a controller, according to embodiments of the present disclosure.
Figure 16:
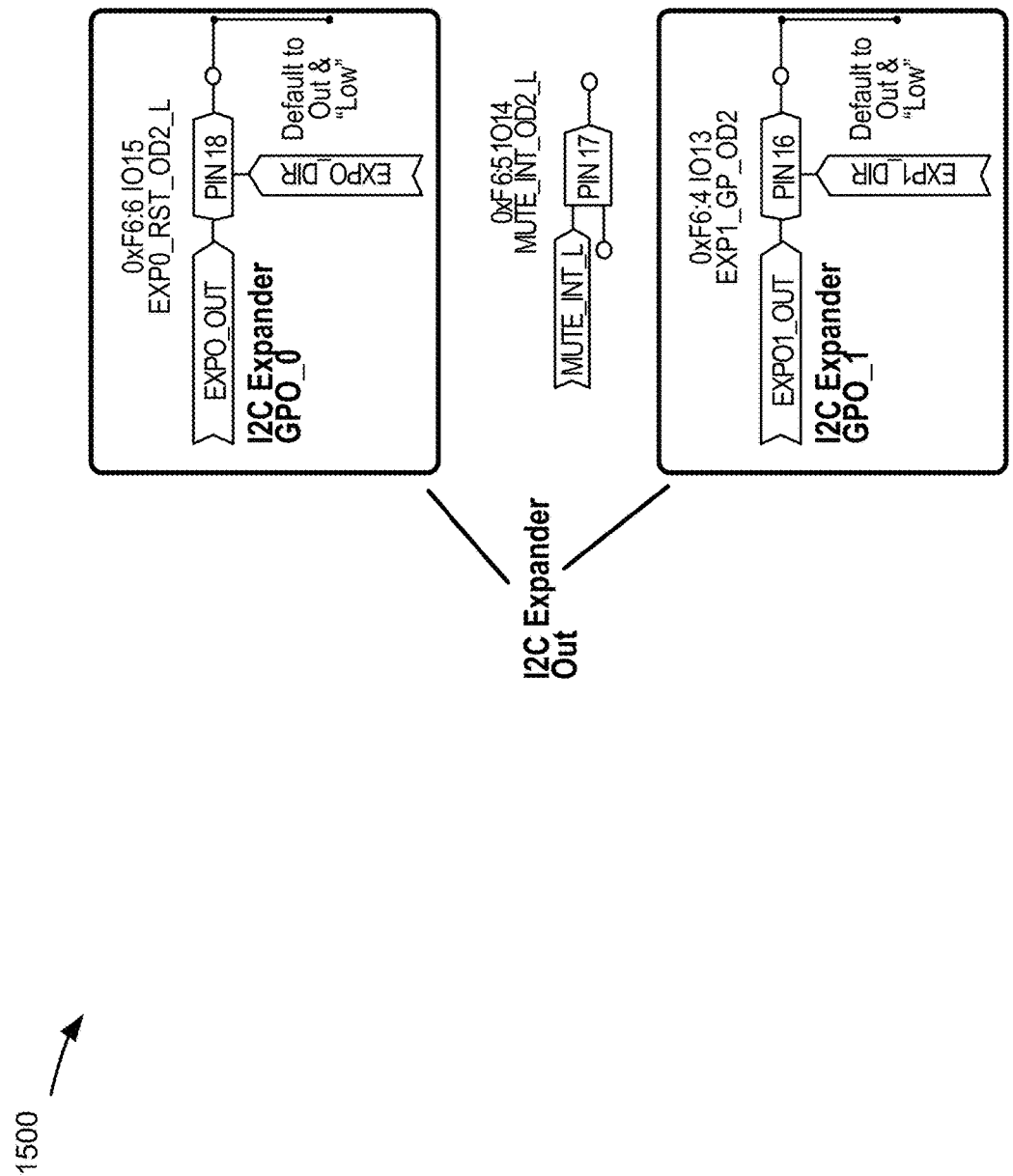
FIG. 16 illustrates an example of a second portion of a circuit implementation of a controller, according to embodiments of the present disclosure.

FIGS. 15-17 illustrate an example CPLD architecture of the controller 1400 that implements the logic described in connection with FIGS. 5-13. The pinout illustrated in FIG. 14 is showed in these figures. In particular, FIG. 15 illustrates an example of a first portion 1500 of the circuit implementation of the controller 1400, according to embodiments of the present disclosure. Here, the first portion 1500 involves pins "1" through "7," and pins "19" and "20" and includes a mute circuit for setting the sensing state (e.g., per the logic of FIGS. 5-10), a circuit for processing button data and external interrupts, and a brownout monitoring circuit. FIG. 16 illustrates an example of a second portion 1600 of a circuit implementation of the controller 1400, according to embodiments of the present disclosure. The second portion 1600 involves pins "16" through "18" and includes an I2C expanded circuit. FIG. 17 illustrates an example of a third portion 1700 of a circuit implementation of the controller 1400, according to embodiments of the present disclosure. The third portion 1700 involves pins "8" through "15" and includes an LED interface circuit, a multi-modal gating function circuit, and an I2C configuration register.

Turning to FIG. 15, the mute circuit is shown in the top portion of the figure. On pin "20", a "MUTE_STATE_L" signal is output, corresponds to the first mute state signal described herein above, and can be addressable using a first I2C address. On pin "19," a "MUTE_STATE" signal is output, corresponds to the second mute state signal described herein above, and can be addressable using a second I2C address.

A button activation signal can be received on any of pins "2" through "4," each of which being coupled to a button. Corresponding button data can be stored and addresses using internal I2C addresses. Further, a state for each button can be generated based on the corresponding button signal, whereby a D flip-flop is used to generate the state. Such state data is also stored and addresses using internal I2C addresses. Similarly, an external interrupt signal can be received on pin "5," resulting in input data and state data being stored by the controller 1400.

Pin "2" is coupled with a mute button. The mute button signal received through this pin can be further processed to implement the logic described in connection with FIG. 12. In particular, a lookout table (illustrated as "LUT1" in FIG. 15") to set a state of the mute button (illustrated as "MUTE_BTN_L"). The input to the lookout table includes the received mute button signal, a gating function signal indicating the power state associated with the computing device, a configuration signal indicating whether the computing device is multi-modal or not, and a reset signal. The mute button state signal and any of the other button state signals and external interrupt signals can be processed through an OR logic to generate an interrupt signal (illustrated as "MUTE_INT_L").

Through pin "6," a $V_{DD}$ can be determined by the brown-out monitor circuit. This voltage level can be compared to a threshold value (illustrated as 1,000 mV in FIG. 15) to detect a brownout condition. The brownout monitoring circuit outputs a signal indicating the brownout detection (shown as "UVLO_L" in FIG. 15). This signal can be used as part of implementing the logic of FIG. 13 by being input to a lookout table (illustrated as "LUT2" in FIG. 15). The input to this table also includes the sensing state signal (shown as "MUTE_L"), a fault signal indicating whether a failure is detected at a light source (shown as a "Fault_L") and a mute setting signal indicating the current sensing state. An output is a signal that may force the disabled sensing state or to prevent a change to the sensing state upon a brownout detection (the output is shown as "MUTE_SET_L).

As shown in FIG. 16, the interrupt signal ("MUTE_INT_L") can be sent to the SoC via pin "17." Pins "16" and "18" are configured as GPO pins to support an I2C expander. This expanded can be used to read data stored at the different memory locations (e.g., registers) of the controller 1400 by using I2C addresses.

The I2C addresses can be stored in n internal I2C configuration register connected to pins "8" and "9" as shown in FIG. 17. Pin "11" is connected to the ground. Pin "13" can be connected to a light source (e.g., to a cathode of an LED) to determine a voltage level, and this voltage level can be compared to a threshold value (shown as 1,200 mV in FIG. 17) in order to determine failure at the light source. The output failure detection is shown as a "FAULT_L" signal. This signal can be input to the second lookout table "LUT2."

Through pin "15," a voltage level $V_{CC}$ is measured and compared to a threshold value (shown as 1,000 mV in FIG. 17). If below the threshold, an OFF power state is determined. Otherwise, an ON power state is determined. The power state is shown as being indicated with a "MM_Gate_L" signal corresponding to a multi-modal gating function, and this signal can be input to the first lookout table "LUT1."

FIGS. 18-21 illustrate flows for controlling one or more sensors and operations of a computing device. The computing device can be any of the computing device 100 of FIG. 1 or the computing device 200 of FIG. 2. The operations of the flow can be performed by a controller of the computing device. The controller can be any of the controllers described herein above.

Figure 18:
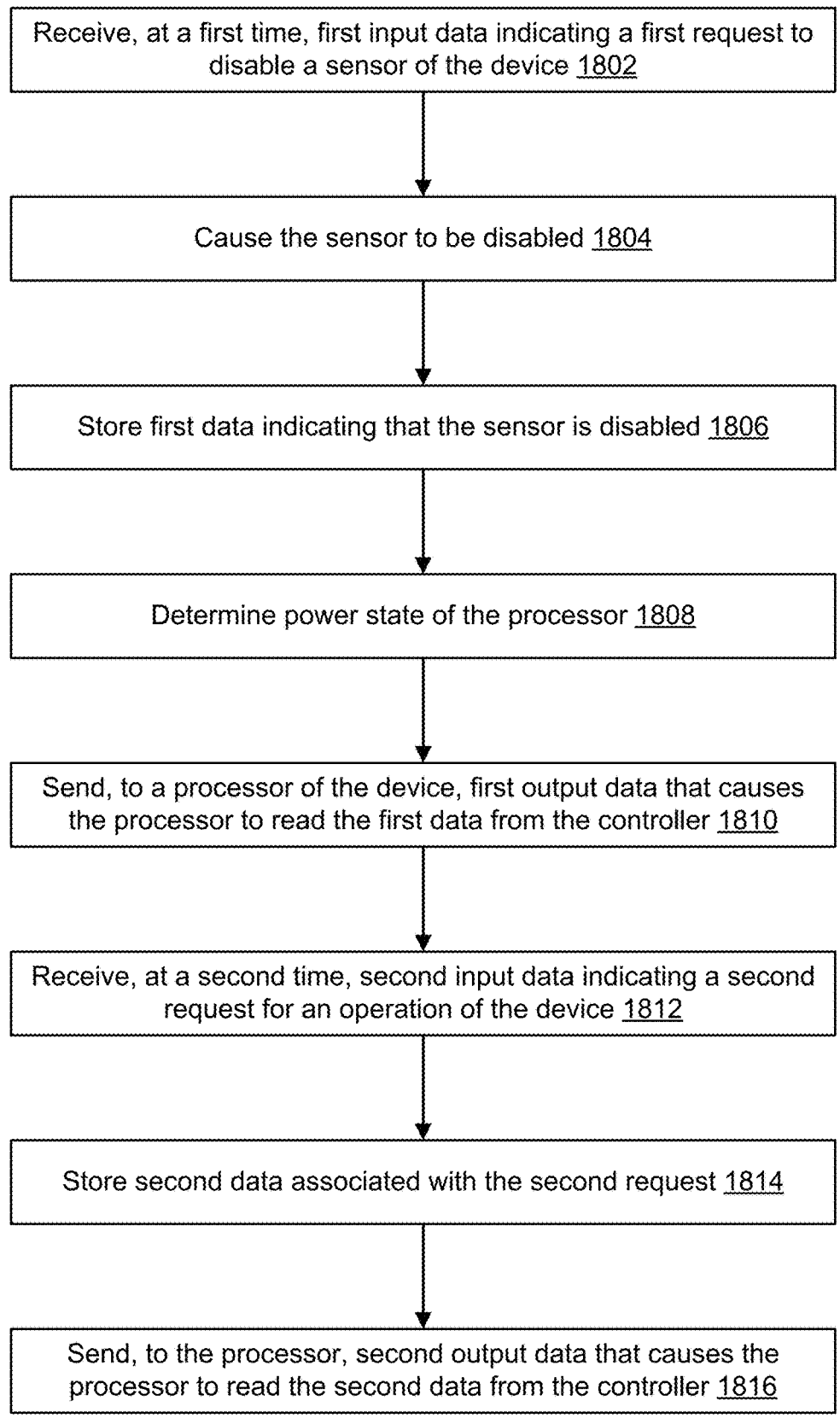
FIG. 18 illustrates an example of a flow for controlling a sensing state and operations of a computing device, according to embodiments of the present disclosure.

FIG. 18 illustrates an example of a flow for controlling a sensing state and operations of the computing device, according to embodiments of the present disclosure. The sensing state can correspond to a single sensor or multiple sensors of the computing device. As illustrated in FIG. 18, the flow may start at operation 1802, where the controller receives, at a first time, first input data indicating a first request to disable a sensor of the computing device. The first input data can be received based on an activation of a mute button coupled with the controller, or based on a request of a processor (e.g., an SoC) configured to execute program code for one or more operations of the computing device.

At operation 1804, the controller causes the sensor to be disabled. For example, based on a determination that the current sensing state is enabled, the controller can disconnect the sensor from a power source and blank or zero data that would be generated and sent by the sensor to the processor.

At operation 1806, the controller stores first data indicating that the sensor is disabled. For instance, the controller updates the sensing state from its current status of enabled to an updated status of enabled. The sensing state can be stored at a memory location of the controller. This memory location may have an I2C address.

At operation 1810, the controller determines a power state of the processor. For instance, the controller determines a voltage level of the processor and compares the voltage level to a voltage threshold value. If larger than the voltage threshold value, the controller determines that the processor is powered ON. If smaller than the voltage threshold value, the controller determines that the processor is powered OFF. The controller can also store power state data indicating the power state, as described in connection with FIG. 12. The power state data can be used as part of a mute lock out logic to enable/disable certain functionalities of the mute button. For instance, if the power state is a power ON state, the mute out logic can enable the enabling or disabling of the sensor based on an activation of the button, which can result in the controller sending interrupt data to the processor such that the processor can read the sensing state data, the button activation data, or the button state data from the controller. If the power state is a power OFF state, the mute out logic can enable the enabling or disabling of the sensor based on an activation of the button, but the controller may not send interrupt data to the processor. Alternatively, the button functionality can be disabled to prevent a change to the sensing state.

At operation 1810, the controller sends, to the processor, first output data that causes the processor to read the first data from the controller. For instance, the first output data corresponds to first interrupt data. Upon receiving the first interrupt data, the processor can request and receive the first data from the memory location.

At operation 1812, the controller receives, at a second time, second input data indicating a second request for an operation of the device. For instance, this second input data can be received based on a button activation or an external interrupt from a device component. The button activation can be associated with the mute button (e.g., activated again to re-enable the sensor or to power OFF the computing device) or from another button coupled with the processor (e.g., from a volume up button, a volume down button, or an action button).

At operation 1814, the controller stores second data associated with the second request. For instance, the second data indicates that the relevant button has been activated or the relevant component has sent an interrupt and/or a state of the relevant button or of the relevant component. The second data can be stored at one or more memory locations of the controller, where each of such memory locations can have an I2C address.

At operation 1864, the controller sends, to the processor, second output data that causes the processor to read the second data from the controller. For instance, the first output data corresponds to second interrupt data. Upon receiving the interrupt data, the processor can request and receive the second data from the one or more memory locations.

Figure 19:
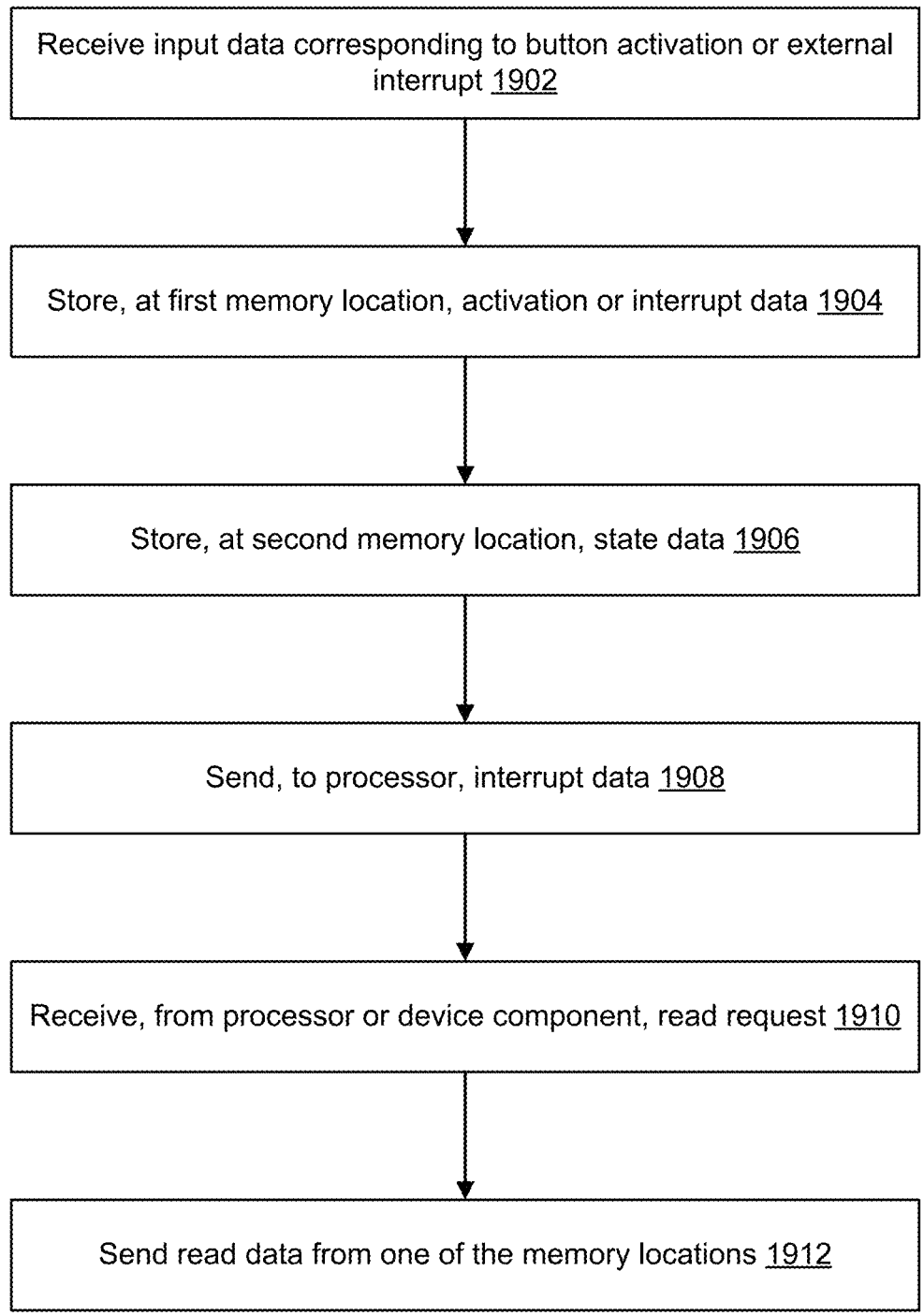
FIG. 19 illustrates an example of a flow for maintaining input data and state data, according to embodiments of the present disclosure.

FIG. 19 illustrates an example of a flow for maintaining input data and state data, according to embodiments of the present disclosure. The controller can maintain the input data and state data based on a button activation and/or an external interrupt. Upon any button activation, external interrupt, or a state change, the controller may send interrupt data to the processor. As illustrated, the flow of FIG. 19 may start at operation 1904, where the controller receives input data corresponding to the button activation or the external interrupt.

At operation 1904, the controller stores, at a first memory location, activation or interrupt data based on the input data. In the case of the button activation, the controller stores an indication that a signal was received from the button. The first memory location can be a register associated with the button and can have a first I2C address. In the case of the interrupt data, the controller stores and indication that an interrupt was received from the relevant component. Here, the first memory location can be a register associated with the relevant component and can have a first I2C address.

At operation 1906, the controller stores, at a second memory location, state data. In the case of the button activation, the controller can generate state data indicating a change to a state of the button (e.g., that the button is activated if it was deactivated, or vice versa). In the particular case of a mute button, the controller can use logic that at least considers the power state and the configuration of the computing device, in addition to the button activation, to determine the change to the state of the mute button or not. The second memory location can be a register associated with the button and can have a first I2C address. In the case of the interrupt data, the controller stores and indication of a state of the component, such as the component having sent an interrupt (or other possible states, such as the component being activated, deactivated, and the like). Here also, the second memory location can be a register associated with the relevant component and can have a first I2C address.

At operation 1908, the controller sends interrupt data to the processor. In an example, an OR logic is used, whereby a change to any of the states corresponding to the buttons and/or component can trigger the controller to generate and send the interrupt data to the processor, thereby indicating the change. In another example, the OR logic can be applied to the input data, whereby any received signal indicating a button activation or an external interrupt can trigger the controller to generate and send the interrupt data to the processor, thereby indicating the button activation or the external interrupt.

At operation 1910, the controller receives, from the processor, a read request. For instance, the read request can indicate a single memory location from which the relevant data is to be read. Alternatively, the read request can indicate multiple memory locations (and possibly all the memory location) from which the relevant data is to be read. For instance, the read request can correspond to an interrupt vector to read all the stored states.

At operation 1912, the controller sends read data from one or more memory locations based on the read request. For instance, the controller outputs the request data from the relevant memory locations to the processor.

Figure 20:
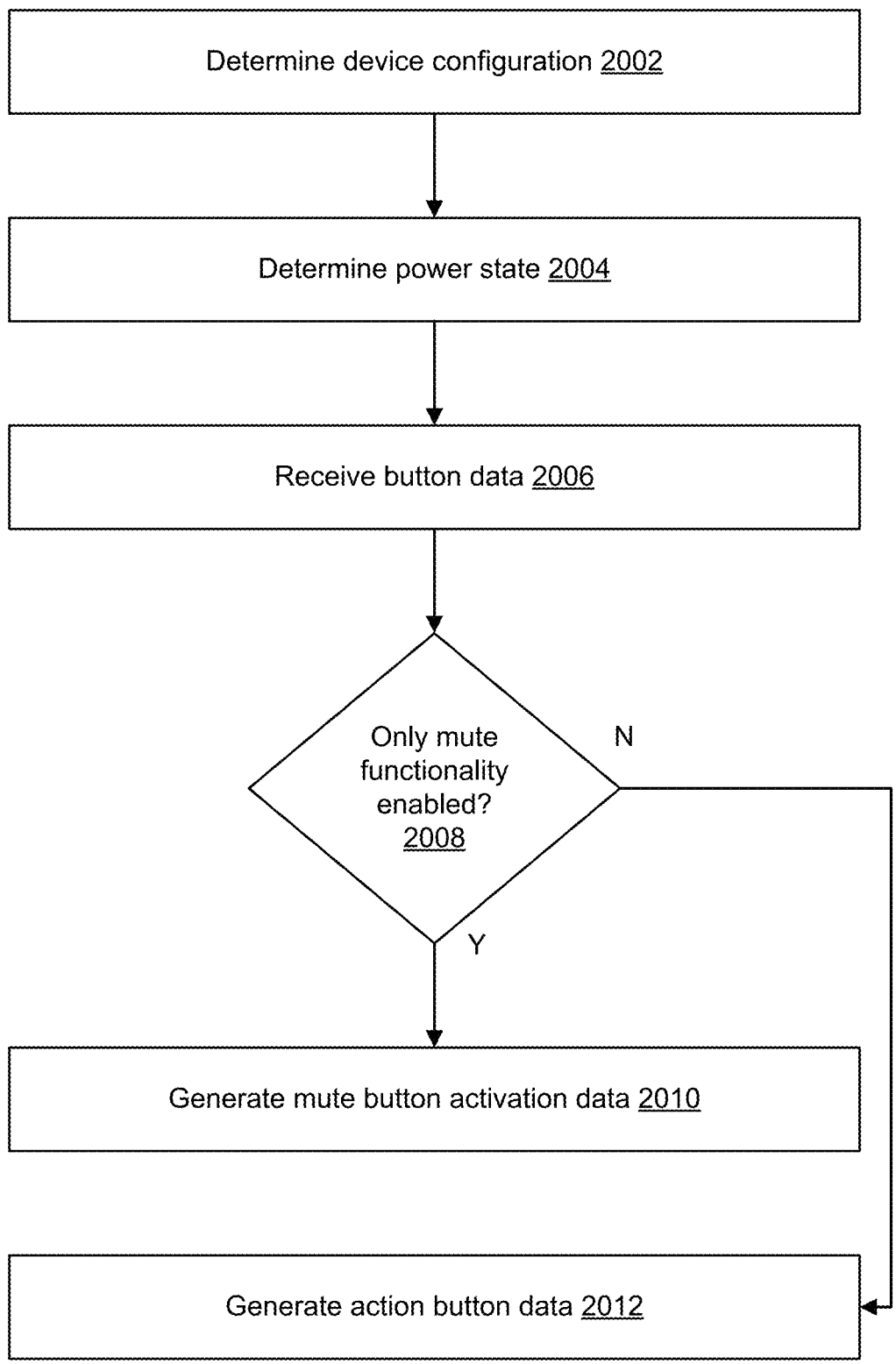
FIG. 20 illustrates an example of a flow for controlling a functionality of a mute button, according to embodiments of the present disclosure.

FIG. 20 illustrates an example of a flow for controlling a functionality of a mute button, according to embodiments of the present disclosure. In an example, the mute button can be used only to enable/disable a sensor (or a set of sensors). In another example, its functionality can be extended such that the mute button can be used as an action button too. The control of the functionalities can be based on the configuration (e.g., whether multi-modal or not) and the power state of the computing device (e.g., whether the computing device, or a component thereof such as the SoC, is powered ON or OFF). As illustrated, the flow of FIG. 20 may start at operation 2002, where the controller determines the device configuration. For example, the controller can store configuration data in a register, where a bit or a flag can be used to indicate whether the computing device is multi-modal or not. The device configuration can be determined by reading the configuration data from the register.

At operation 2004, the controller determines the power state. For instance, a voltage level $V_{CC}$ is determined and compared to a threshold value. If smaller than the threshold value, the controller can determine that the power state is OFF; Otherwise, the controller can determine that the power state is ON.

At operation 2006, the controller receives button data of a button. The button data can indicate an activation of the button, a state of the button, and/or a sensing state of the sensor. In an example, the button is the mute button.

At operation 2008, the controller determines whether the mute functionality is enabled. For instance, this determination is based on the configuration, power state, and the button data. Logic, similar to the one shown in the LUT1 table, can be used. In an example, assume that the configuration indicates a multi-mote device. In this example, if the power state is ON, the mute button can be configured for a dual-functionality: for muting and for triggering an action. In this case, if the mute button data indicates a button activation for more than a predefined time period (e.g., a button press and hold for more than three seconds), the action can be triggered. Otherwise, the muting function can be triggered (e.g., to enable the sensor if disabled or to disable it if enabled). If the power state is OFF, the functionality can be limited to changing it to ON. In this case, if the mute button data indicates a button activation for more than the predefined time period (e.g., a button press and hold for more than three seconds), the power state can be change. Otherwise, the button activation can be ignored. In another example, assumed that the configuration indicates that the computing device is not multi-modal. In this example, the mute button can be only used for enabling/disabling the sensor because the computing device includes another action button. As such, if the power state is ON and the button data indicates a button activation, the sensing state can be changed (e.g., from enabled to disabled or vice versa). However, if the power state is OFF, the sensing state cannot be changed regardless of the button data. Upon determining that only the mute function is enabled, operation 2010 follows operation 2008. Otherwise, operation 2012 follows operation 2008.

At operation 2010, the controller generates mute button activation data. For instance, if the sensing state is enabled, the sensing state can be changed to disabled and the mute button activation data can indicate this change. Conversely, if the sensing state is disabled, the sensing state can be changed to enabled and the mute button activation data can indicate this change.

At operation 2012, the controller generates action button data. Here, because the mute button can be used to trigger the action, upon determining that the button activation is longer than the predefined time period, the controller can trigger the processor to present selectable actions. Upon a selection of an action based on user input, the processor can perform the action. An example of an action includes powering OFF the processor when the processor is powered ON. In this case, the action button data causes the processor to be powered off, whereby the action button data causes the processor to present this selectable action, receive user input indicating the selection, processing the user input, and staring a shutdown procedure. Another example of an action includes powering ON the processor when the processor is powered OFF. In this case, the action button data can cause a set of switches that connect the processor to a power source to be closed, thereby causing power to be supplied to the processor to trigger a booting procedure. However, upon determining that the button activation is shorter than the predefined time period, the action button data can indicate that the sensing state is to be changed.

Figure 21:
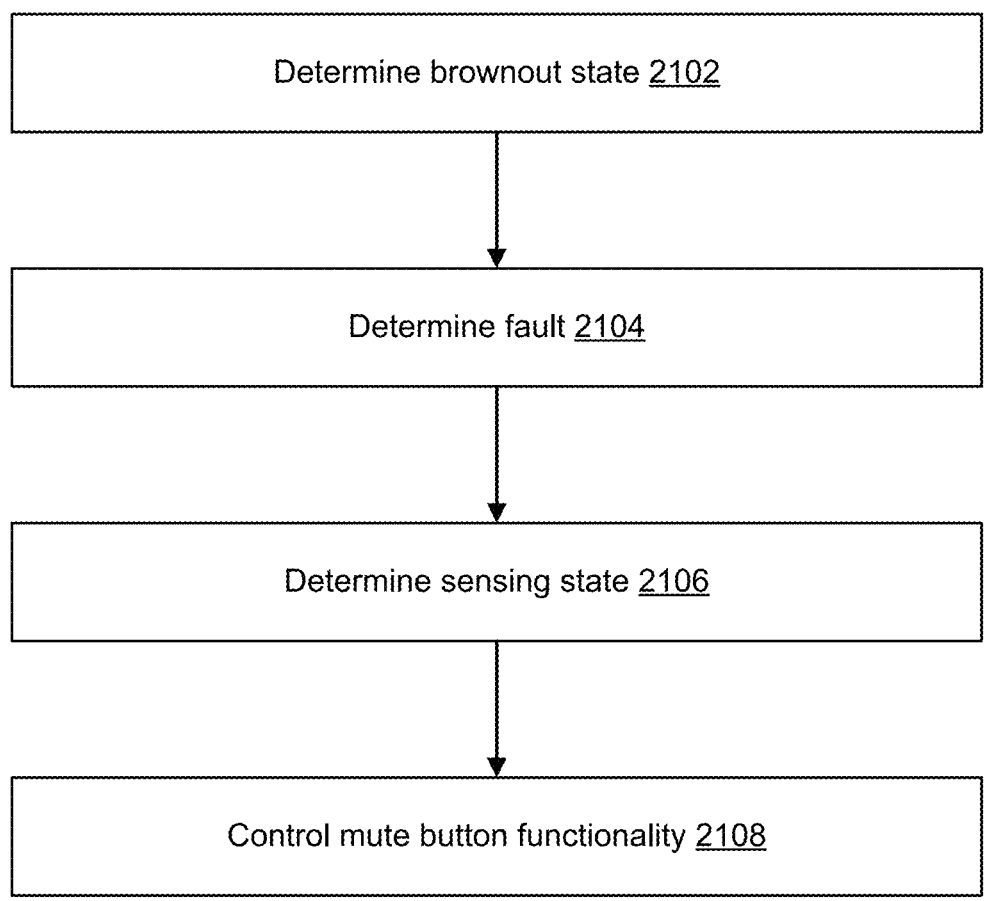
FIG. 21 illustrates an example of a flow for controlling the locking of a mute functionality of a device, according to embodiments of the present disclosure.

FIG. 21 illustrates an example of a flow for controlling the locking of a mute functionality of the computing device, according to embodiments of the present disclosure. In an example, the locking can involve preventing a change to the sensing state in case of a brownout or the forcing of a disabled sensing state in case of a fault detected at, for instance, a light source. The flow of FIG. 21 may start at operation 2102, where the controller determines a brownout state. For instance, a brownout monitoring circuit of the controller can determine whether a voltage level $V_{DD}$ is smaller or larger than a threshold value. If smaller, the brownout is detected. Otherwise, no brownout is detected. In both cases, the controller can store, at a memory location of the controller, brownout data indicating the brownout state (e.g., brownout detected or not detected). As such, the controller can determine the brownout state by reading the brownout data from the memory location.

At operation 21004, the controller determines the fault. For instance, a voltage level at the light source (e.g., at a cathode of an LED) is determined and compared to a threshold value. If smaller than the threshold value, the fault is detected. Otherwise, no fault is detected.

At operation 21006, the controller determines a sensing state. For instance, the controller stores sensing state data in a memory location, where this sensing state data indicates the sensing state. Accordingly, the sensing state can be determined by reading the sensing state data from the memory location. This data can be generated per the logic described in FIGS. 5-10 and can indicate whether the sensor is disabled or enabled.

At operation 21008, the controller controls the mute button functionality. For instance, logic, similar to the one shown in the LUT2 table, can be used. In an example, if the brownout detected, the functionality of the mute button is disabled and a change to the sensing state is prevented. If no brownout is detected, the functionality of the mute button can be disabled, and the sensing state can be forced to become a disabled sensing state if the fault is detected. Otherwise, the functionality of the mute button (e.g., as a single mute functionality or as a dual mute and action functionality, per FIG. 21) is enabled.

Figure 22:
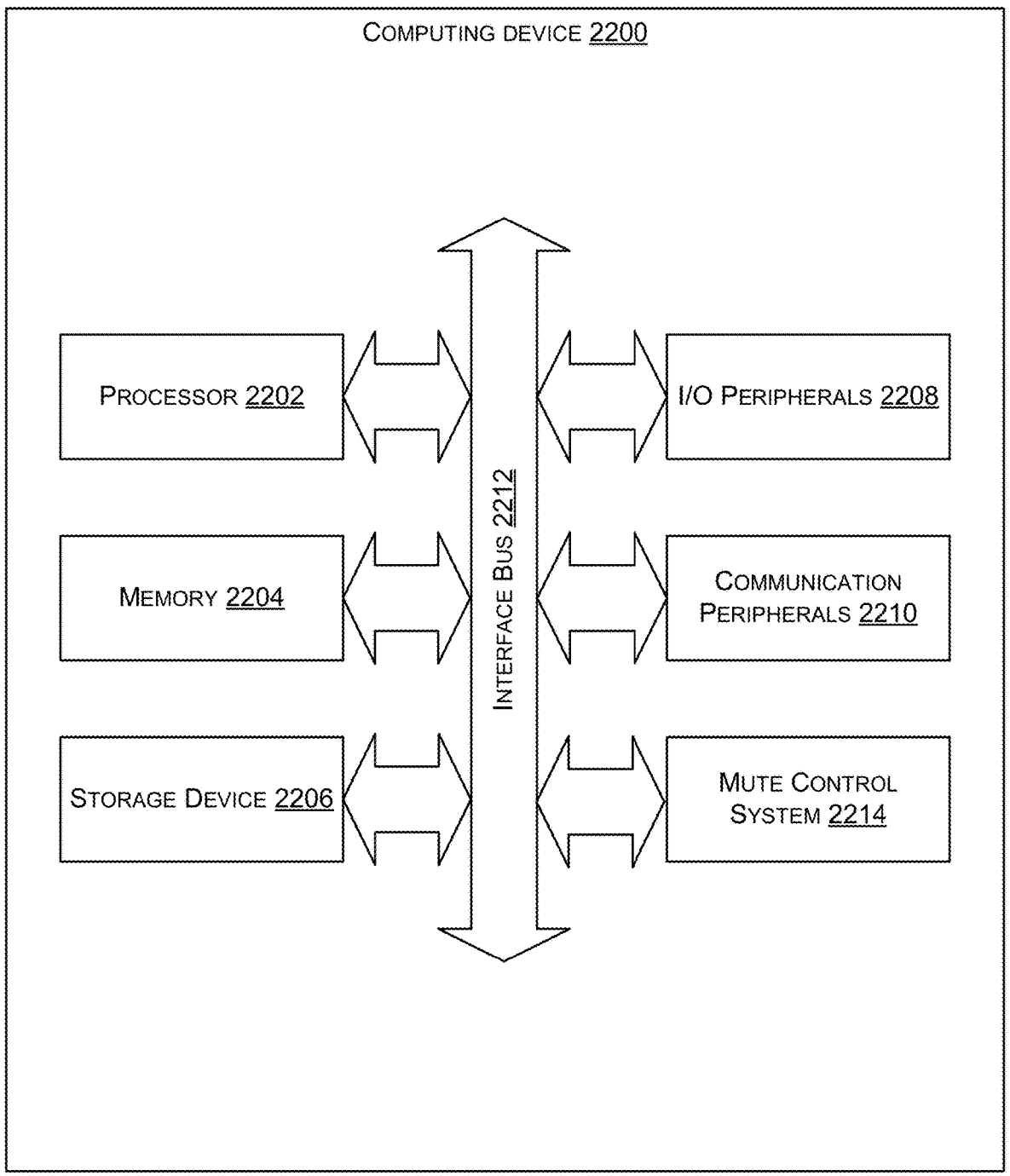
FIG. 22 illustrates an example of an architecture of a computing device that includes mute control circuitry, according to embodiments of the present disclosure.

FIG. 22 illustrates an example of an architecture of a computing device 2200 that includes mute control system 2214, according to embodiments of the present disclosure. The mute control system 2214 can include a button, a controller, and one or more switch sets similar to the components of the computing devices described herein above. Although the components of the computing device 2200 are illustrated as belonging to a same computing device 2200, the computing device 2200 can also be distributed (e.g., between multiple user devices).

The computing device 2200 includes at least a processor 2202, a memory 2204, a storage device 2206, input/output peripherals (I/O) 2208, communication peripherals 2210, an interface bus 2212, and the mute control system 2214. The interface bus 2212 is configured to communicate, transmit, and transfer data, controls, and commands among the various components of the computing device 2200. The memory 2204 and the storage device 2206 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 2204 and the storage device 2206 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computing device 2200.

Further, the memory 2204 includes an operating system, programs, and applications. The processor 2202 is configured to execute the stored instructions and includes, for example, a logical processing unit, a microprocessor, a digital signal processor, and other processors. The memory 2204 and/or the processor 2202 can be virtualized and can be hosted within another computing device of, for example, a cloud network or a data center. The I/O peripherals 2208 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 2208 are connected to the processor 2202 through any of the ports coupled to the interface bus 2212. The communication peripherals 2210 are configured to facilitate communication between the computing device 2200 and other computing devices over a communication network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing devices accessing stored software that programs or configures the portable device from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A device comprising:
a mute button;
a volume button;
a microphone configured to generate audio data;
a processor configured to execute program code that processes the audio data and control an audio volume output of the device; and
a controller powered independently of the processor and coupled with the mute button, the volume button, and the processor via an inter-integrated circuit (I2C) interface, the controller configured to:
receive, at a first time from the mute button, first button data indicating a first request to disable the microphone;
cause the microphone to be disabled;
store first data indicating that the microphone is disabled;
determine that the processor is powered ON by determining that a voltage level of the processor exceeds a voltage threshold value;
send, to the processor, first interrupt data that causes the processor to read the first data from the controller, the first data causing the processor to stop execution of the program code;
receive, at a second time from the volume button, second button data indicating a second request to change the audio volume output of the device;
store second data indicating the second request; and
send, to the processor, second interrupt data that causes the processor to read the second data from the controller, the second data causing the processor to change the audio volume output.

2. The device of claim 1, wherein the controller is further configured to:
receive, after the first time, third button data from the mute button, the third button data indicating an activation of the mute button for a period of time;
determine that the period of time exceeds a threshold value;
determine that the processor is powered ON;
store third data indicating a request to perform an operation by the processor; and
send, to the processor, third interrupt data that causes the processor to read the third data from the controller, the third data causing the processor to present selectable actions on a user interface.

3. The device of claim 1, wherein the controller is further configured to:
receive, after the first time, third button data from the mute button;
determine that the processor is powered OFF;
store third data indicating a request to power ON the processor;
send, to the processor, third interrupt data that causes the processor to read the third data from the controller, the third data causing the processor to be powered ON; and
prevent disabling of the microphone.

4. A method implemented by a controller of a device, the method comprising:
receiving, at a first time, first input data indicating a first request to disable a sensor of the device, the first input data corresponding to a first activation of a first button coupled with the controller;
causing the sensor to be disabled;
storing first data indicating that the sensor is disabled;
determining that a processor coupled with the controller is powered ON;
sending, to the processor, first output data that causes the processor to read the first data from the controller, the first data causing the processor to stop execution of program code associated with the sensor;
receiving, at a second time, second input data indicating a second request for an operation of the device, the second input data corresponding to a second activation of a second button coupled with the controller;
storing second data associated with the second request; and
sending, to the processor, second output data that causes the processor to read the second data from the controller, the second data causing the processor to perform the operation.

5. The method of claim 4, wherein:
receiving the first input data comprises receiving, via an inter-integrated circuit (I2C) interface, first button data from indicating a request to disable a microphone of the device;
sending the first output data comprises sending, via the I2C interface, first interrupt data to the processor;
receiving the second input data comprises receiving, via the I2C interface, second button data indicating a request to change an audio volume output of the device; and
sending the second output data comprises sending, via the I2C interface, second interrupt data to the processor.

6. The method of claim 4, further comprising
determining, based at least in part on the first input data and the processor being powered ON, a state of the first button; and
including, in the first data, a first indication of the state of the first button.

7. The method of claim 6 further comprising:
determining the first activation of the first button based at least in part on the first input data; and
including, in the first data, a second indication of the first activation, the first indication and the second indication stored at different memory addresses of the controller.

8. The method of claim 4, further comprising:
receiving, from a component of the device, first interrupt data indicating a third request to interrupt the operation;
storing third data associated with the third request; and
sending, to the processor, second interrupt data that causes the processor to read the third data from the controller, the second interrupt data causing the processor to stop performing the operation.

9. The method of claim 4, further comprising:
storing configuration data indicating that an input/output modality of the device includes a display;
determining, based at least in part on the first input data, an activation of a mute button of the device;
determining a power state of the processor;

generating third output data based at least in part on the input/output modality, the activation, and the power state, the third output data indicating that the sensor is to be disabled; and sending the third output data to the sensor.

10. The method of claim 4, further comprising:

receiving, at a third time, third input data indicating a third request to enable the sensor, wherein the first data indicates that a sensing state of the sensor is disabled;

causing the sensor to be enabled;

storing sensing state data indicating that the sensing state is enabled;

determining that a voltage level of the device has dropped below a threshold value; and storing, based at least in part on the voltage level, fourth data indicating that the sensing state cannot be changed from enabled to disabled.

11. The method of claim 4, wherein receiving the first input data comprises receiving first button data from a mute button of the device indicating a request to disable a microphone of the device, and wherein the method further comprises:

determining that a voltage level of the device exceeds a threshold value; and sending, based at least in part on the voltage level, third output data to the sensor, the third output data causing the sensor to be disabled.

12. The method of claim 4, further comprising:

receiving, at a third time, third input data indicating a third request to enable the sensor;

causing the sensor to be enabled;

receiving, from a light source of the device, fourth input data indicating that light emission by the light source is associated with the sensor being disabled;

determining that a voltage level of the device exceeds a threshold value; and sending, based at least in part on the voltage level and the light emission, third output data to the sensor, the third output data causing the sensor to be disabled.

13. A device comprising:

a processor; and a controller coupled with the processor, the controller configured to:

receive, at a first time, first input data indicating a first request to disable a sensor of the device, the first input data corresponding to a first activation of a first button coupled with the controller;

cause the sensor to be disabled;

store first data indicating that the sensor is disabled;

determine that the processor is powered ON;

send, to the processor, first output data that causes the processor to read the first data from the controller, the first data causing the processor to stop execution of program code associated with the sensor;

receive, at a second time, second input data indicating a second request for an operation of the device, the second input data corresponding to a second activation of a second button coupled with the controller;

store second data associated with the second request; and send, to the processor, second output data that causes the processor to read the second data from the controller, the second data causing the processor to perform the operation.

14. The device of claim 13, wherein the controller is further configured to:

determine configuration data of the device, the configuration data indicating that an input/output modality of the device includes a display;

determine a power state of the device; and control, based at least in part on the input/output modality and the power state, functionality of the first button, the functionality comprising at least one of muting the sensor or power ON or OFF the device.

15. The device of claim 13, wherein the first input data is received by at least receiving mute button data of the first button of the device, and wherein the controller is further configured to:

store third data indicating a first activation of the first button and a first state of the first button, wherein the first output data causes the processor to determine the first activation or the first state based at least in part on the third data.

16. The device of claim 13, wherein the controller is further configured to:

receive third input data indicating a first activation of the first button of the device;

store third data indicating the first activation and a first state of the first button;

receive fourth input data indicating a second activation of the second button of the device;

store fourth data indicating the second activation and a second state of the second button;

generate interrupt data based at least in part on the third data or the fourth data; and send the interrupt data to the processor, the interrupt data causing the processor to read at least a portion of the third data or the fourth data from the controller.

17. The device of claim 16, wherein the controller is further configured to:

receive, from a component of the device, fifth input data indicating a third request to interrupt the operation; and store fifth data associated with the third request, wherein the interrupt data is further generated based at least in part on the fifth data.

18. The device of claim 13, wherein the controller is further coupled with the sensor via a first plurality of pins and with a light emitting diode (LED) driver via a second plurality of pins of the controller, and wherein the controller is further configured to:

generate mute data indicating that the sensor is to be disabled; and set outputs on the first plurality of pins and the second plurality of pins based at least in part on the mute data.

19. The device of claim 18, wherein the controller is further configured to:

determine a voltage level of the device based at least in part on an input to a pin of the controller;

determine a power state of the device based at least in part on a comparison of the supply voltage level with a threshold value; and control, based at least in part on the power state, functionality of the first button, the functionality comprising disabling the sensor.

20. The device of claim 13, wherein the controller is coupled with a button and is further configured to:

store, at one or more memory locations associated with the first button, at least one of activation data indicating an activation status of the first button or state data indicating a state of the first button;

receive, from a component of the device, a read request associated with at least one of the one or more memory locations; and send, to the component, at least one of the activation data or the state data in response to the read request.

\* \* \* \* \*